United States Patent
Hasegawa

(10) Patent No.: US 9,207,893 B2
(45) Date of Patent: Dec. 8, 2015

(54) IMAGE FORMING APPARATUS WITH SPEED DETERMINATION

(71) Applicant: Konica Minolta, Inc., Chiyoda-ku (JP)

(72) Inventor: Satoshi Hasegawa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 20 days.

(21) Appl. No.: 14/134,733

(22) Filed: Dec. 19, 2013

(65) Prior Publication Data

US 2014/0168704 A1  Jun. 19, 2014

(30) Foreign Application Priority Data

Dec. 19, 2012 (JP) ................... 2012-276447

(51) Int. Cl.
*G06F 3/12* (2006.01)
*G06K 15/02* (2006.01)
*G06K 15/00* (2006.01)

(52) U.S. Cl.
CPC .......... *G06F 3/1254* (2013.01); *G06K 15/1823* (2013.01)

(58) Field of Classification Search
CPC ... G06F 3/1211; G06F 3/1215; G06F 3/1254; G06K 15/1822; G06K 15/1823; G03G 21/20
See application file for complete search history.

(56) References Cited

U.S. PATENT DOCUMENTS

| | | | |
|---|---|---|---|
| 2005/0190383 A1* | 9/2005 | Levin et al. | 358/1.1 |
| 2008/0298827 A1 | 12/2008 | Akiyama et al. | |
| 2011/0142460 A1* | 6/2011 | Sugano | 399/44 |

FOREIGN PATENT DOCUMENTS

| | | |
|---|---|---|
| JP | 10-010916 A | 1/1998 |
| JP | 2000-137407 A | 5/2000 |
| JP | 2006-242982 A | 9/2006 |
| JP | 2006-243377 A | 9/2006 |
| JP | 2006-251060 A | 9/2006 |
| JP | 2007-076343 A | 3/2007 |
| JP | 2008-180899 A | 8/2008 |
| JP | 2008-296473 A | 12/2008 |
| JP | 2009-031580 A | 2/2009 |

(Continued)

OTHER PUBLICATIONS

Office Action (Notification of Reasons for Refusal) issued on Jan. 27, 2015, by the Japanese Patent Office in corresponding Japanese Patent Application No. 2012-276447, and an English Translation of the Office Action. (4 pages).

(Continued)

*Primary Examiner* — Dov Popovici

(74) *Attorney, Agent, or Firm* — Buchanan Ingersoll & Rooney PC

(57) ABSTRACT

An image forming apparatus executes a print job at an initial processing speed and switching the initial processing speed to a delayed processing speed lower than the initial processing speed upon detecting occurrence of a specific condition under which continuing the print job at the initial processing speed is determined not possible. The image forming apparatus acquires a print job targeted to be executed; estimates a processing time to be taken to complete the target print job at each of a plurality of processing speeds selected as candidates for the initial processing speed; and determines, as the initial processing speed, one of the candidate processing speeds that corresponds to the shortest processing time among the processing times estimated by the estimator.

21 Claims, 28 Drawing Sheets

(56) References Cited

FOREIGN PATENT DOCUMENTS

| | | |
|---|---|---|
| JP | 2010-097111 A | 4/2010 |
| JP | 2011-059325 A | 3/2011 |
| JP | 2012-245649 A | 12/2012 |

OTHER PUBLICATIONS

Decision to Grant Patent issued on Jul. 7, 2015, by the Japanese Patent Office in corresponding Japanese Patent Application No. 2012-276447, with an English translation of the Decision. (4 pages).

* cited by examiner

FIG. 5

| System speed (mm/sec) | Print speed (sheets/min) | Relationship between num of prints & print time | | | | |
|---|---|---|---|---|---|---|
| | | 200 sheets | 400 sheets | 600 sheets | 800 sheets | 1000 sheets |
| 185 | 30 | 420 sec | 840 sec | 1260 sec | 1860 sec | 2700 sec |
| 167 | 27 | 460 sec | 930 sec | 1370 sec | 1850 sec | 2610 sec |
| 148 | 24 | 540 sec | 1020 sec | 1500 sec | 2040 sec | 2520 sec |

FIG. 7

| System speed (mm/sec) | Print speed (sheets/min) | Relationship between num of prints & print time | | | | |
|---|---|---|---|---|---|---|
| | | 250 sheets | 500 sheets | 750 sheets | 1000 sheets | 1250 sheets |
| 185 | 30 | 540 sec | 1020 sec | 1800 sec | 2880 sec | 3840 sec |
| 167 | 27 | 600 sec | 1140 sec | 1860 sec | 2760 sec | 3900 sec |
| 148 | 24 | 660 sec | 1260 sec | 1920 sec | 2640 sec | 3960 sec |

FIG. 9

| System speed (mm/sec) | Print speed (sheets/min) | Relationship between num of prints & print time | | | | |
|---|---|---|---|---|---|---|
| | | 50 sheets | 100 sheets | 150 sheets | 200 sheets | 250 sheets |
| 185 | 30 | 100 sec | 205 sec | 392 sec | 590 sec | 783 sec |
| 167 | 27 | 112 sec | 239 sec | 385 sec | 565 sec | 750 sec |
| 148 | 24 | 125 sec | 252 sec | 379 sec | 540 sec | 715 sec |

FIG. 14

| System speed (mm/sec) | AV (%) ≥ 80% | | | AV (%) ≥ 60% and < 80% | | | AV (%) ≥ 40% and < 60% | | |
|---|---|---|---|---|---|---|---|---|---|
| | R (sec) | S (sec) | D (sec) | R (sec) | S (sec) | D (sec) | R (sec) | S (sec) | D (sec) |
| 185 | 4 | 2 | 2 | 3 | 2 | 1 | 2.5 | 2 | 0.5 |
| 167 | 4 | 2.2 | 1.8 | 3 | 2.2 | 0.8 | 2.5 | 2.2 | 0.3 |
| 148 | 4 | 2.5 | 1.5 | 3 | 2.5 | 0.5 | 2.5 | 2.5 | 0 |

FIG. 25A

| Num of prints at which 2nd temperature-rise delay process starts | Print time table for edge-temperature rise to be used |
|---|---|
| 301~400 | Table A |
| 401~500 | Table B |
| 501~600 | Table C |
| 601~700 | Table D |
| 701~800 | Table E |

FIG. 25B

| Num of prints at which 3rd temperature-rise delay process starts | Print time table for developer-temperature rise to be used |
|---|---|
| 301~400 | Table H |
| 401~500 | Table I |
| 501~600 | Table J |
| 601~700 | Table K |
| 701~800 | Table L |

IMAGE FORMING APPARATUS WITH SPEED DETERMINATION

CROSS-REFERENCE TO RELATED APPLICATION

This application is based on application No. 2012-276447 filed in Japan, the contents of which are hereby incorporated by reference.

BACKGROUND OF THE INVENTION (1) Field of the Invention

The present invention relates image forming apparatuses, such as printers, copiers, and the like. In particular, the present invention relates to a technology for improving the productivity of print operation of an image forming apparatus that executes a delay process to provide a wait time by suspending the execution of print operation or by reducing the print speed. The delay process is executed with the aim of preventing the decrease in image quality or deterioration of the apparatus parts due to changes in temperature and the like in the image forming apparatus during print jobs.

(2) Description of the Related Art

To improve the print operation productivity, image forming apparatuses, such as printers, copiers, and the like are required to process print operation at a higher processing speed. However, by continually processing print operation at high speed, the temperature of the image forming apparatus tends to increase. This may cause problems such as the thermal deterioration of apparatus parts, the image quality degradation as a result melting and subsequent sticking of the toner in a developer, and the like.

In a two-sided printing mode, recording sheets after the thermal fixing are stacked on one another at high speed in an exit tray. Therefore, heat accumulated in the recording sheets cannot be dissipated easily, which increases the risk of tacking.

For example, JP 10-010916-A discloses one technology for solving the problems noted above. According to the disclosure, a delay process is executed to slow the processing speed by suspending the execution of print operation to provide a wait time when the temperature in the apparatus (in the fixing device) exceeds a predetermined temperature or by lengthening the sheet transfer intervals by a predetermined extent to reduce the print speed when the numbers of prints exceeds a predetermined number. This prevents the temperature rise in the apparatus to solve the problems noted above.

Unfortunately, the delay process described above slows the processing speed of print operation, which decreases the print operation productivity. The decrease in print operation productivity is especially notable when the duration of the delay process is prolonged.

The decrease in print operation productivity caused by a delay process may be suppressed by shortening the sheet transfer intervals after the delay process (see JP 2006-251060-A). Yet, the shorting of sheet transfer intervals may lead to a temperature rise in the apparatus, which may result in another delay process to be executed during the print operation. In such a case, the print operation productivity is decreased even more.

SUMMARY OF THE INVENTION

In order to solve the problems noted above, an image forming apparatus according to one aspect of the present invention is for executing a print job at an initial processing speed and switching the initial processing speed to a delayed processing speed lower than the initial processing speed upon detecting occurrence of a specific condition under which continuing the print job at the initial processing speed is determined not possible. The image forming apparatus includes: a job acquirer that acquires a print job targeted to be executed; an estimator that estimates a processing time to be taken to complete the target print job at each of a plurality of processing speeds selected as candidates for the initial processing speed; and a determiner that determines, as the initial processing speed, one of the candidate processing speeds that corresponds to the shortest processing time among the processing times estimated by the estimator.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings:

FIG. 5 is a specific example of an edge-temperature-rise print time table used when a delay process is executed as a result of an excessive temperature rise at an edge portion of the heating belt 52;

FIG. 7 is a specific example of a developer-temperature-rise print time table used when a suspend-control delay process is executed as a result of an excessive temperature rise in a developer;

FIG. 9 is a specific example of a sheet-temperature-rise print time table used when an interval-control delay process is executed as a result of an excessive temperature rise of recording sheets.

FIG. 14 is a specific example of a print time table for RIP processing;

FIGS. 25A and 25B are a specific example of selection tables respectively for second and third temperature-rise delay processes, each table showing the relationship between the number of prints and the print-time calculation table to be used depending on the number of prints finished by the time the delay process starts;

DESCRIPTION OF PREFERRED EMBODIMENTS

The following describes an embodiment of an image forming apparatus according to the present invention, by way of a tandem-type digital color printer (hereinafter, simply "printer").

[1] Structure of Printer

Figure 1:
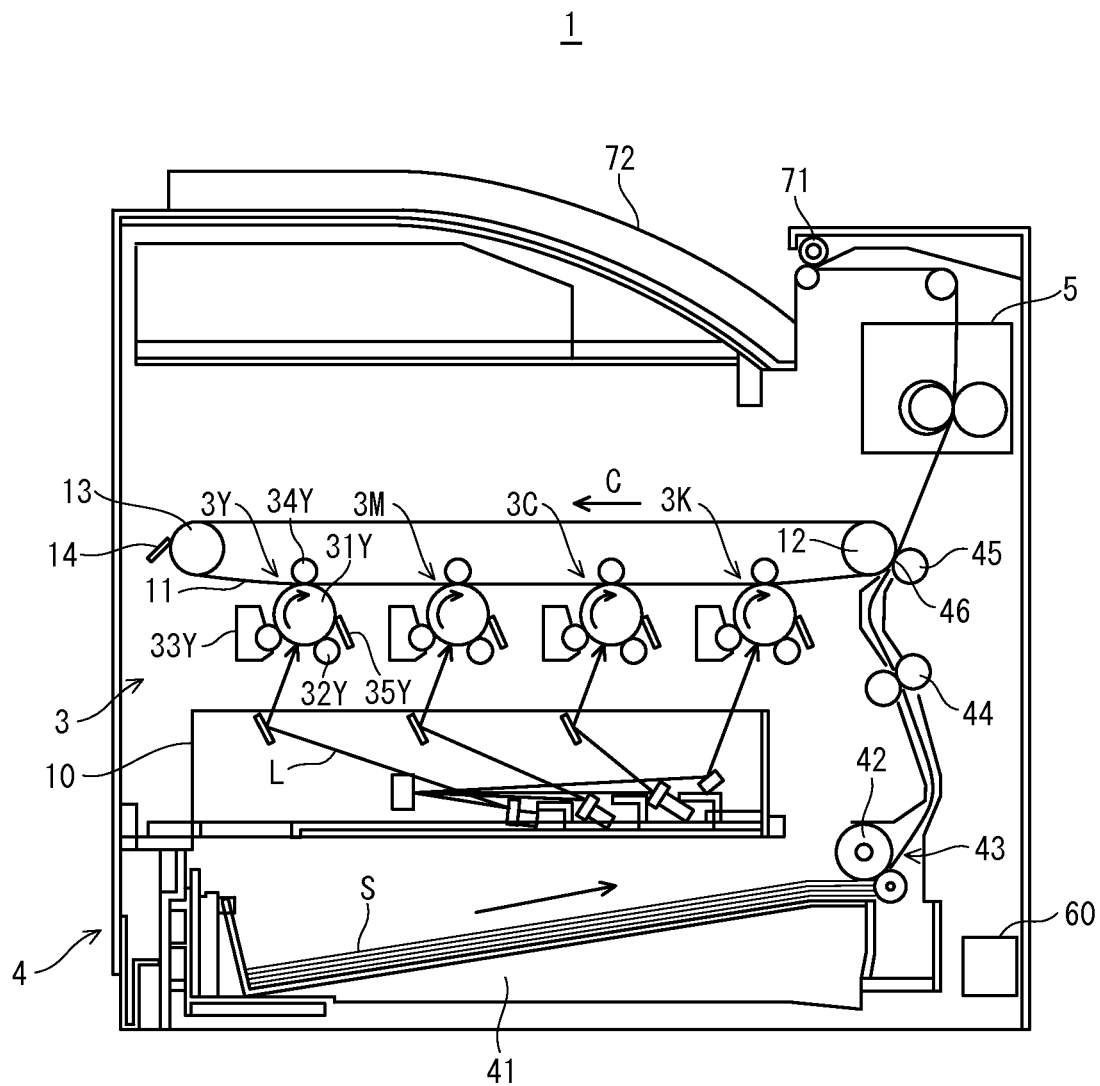
FIG. 1 is a view showing the structure of a printer.

The following describes the structure of a printer according to the present embodiment. FIG. 1 is a view showing the structure of the printer according to the present embodiment. As shown in the figure, the printer 1 includes an image processer 3, a sheet feeder 4, a fixing device 5, and a controller 60.

The printer 1 is connected to a network (such as LAN) to receive requests for executing print operation from an external terminal device (not illustrated) or from an operation panel 7 (shown in FIG. 4) having a non-illustrated display. Upon receipt of such a request, the printer 1 forms toner images of the respective colors of yellow, magenta, cyan, and black, and sequentially transfers the toner images to a recording sheet, so that a full-color image is formed on the recording sheet to complete the print operation. In the following description, the reproduction colors of yellow, magenta, cyan, and black are denoted as Y, M, C and K, respectively, and any structural component related to one of the reproduction colors is denoted by a reference sign attached with an appropriate subscript Y, M, C or K.

The image processer 3 includes image creating units 3Y, 3M, 3C, and 3K, an exposure unit 10, an intermediate transfer belt 11, a second transfer roller 45, and so on. The image creating units 3Y, 3M, 3C, and 3K all have identical structures. Therefore, the following description is given mainly to the structure of the image creating unit 3Y.

The image creating unit 3Y includes a photoconductive drum 31Y and also includes a charger 32Y, a developer 33Y, a first transfer roller 34Y, a cleaner 35Y, and so on, which are disposed about the photoconductive drum 31Y. The cleaner 35Y is provided for cleaning the photoconductive drum 31Y. The image creating unit 3Y forms a yellow toner image on the photoconductive drum 31Y. The developer 33Y is disposed to face the photoconductive drum 31Y and carries charged toner particles to the photoconductive drum 31Y. The intermediate transfer belt 11 is an endless belt wound around a drive roller 12 and a passive roller 13 in taut condition to run in the direction indicated by the arrow C. In the vicinity of the passive roller 13, a cleaner 21 is disposed to remove residual toner from the intermediate transfer belt 11.

The exposure unit 10 includes a light emitting element, such as a laser diode. In accordance with drive signals from the controller 60, the exposure unit 10 emits a laser beam L to sequentially scan the surfaces of the photoconductive drums of the image creating units 3Y, 3M, 3C, and 3K to form images of the respective colors Y, M, C, and K. As a result of the exposure scan, an electrostatic latent image is developed on the surface of the photoconductive drum 31Y charged by the charger 32Y. In a similar manner, an electrostatic latent image is formed on the surface of the photoconductive drum in each of the image creating units 3M, 3C, and 3K. The exposure unit 10 is provided with a temperature sensor 82 for detecting the temperature of the exposure unit 10.

The temperature sensor 82 is provided close to the developers of the respective image creating units 3Y, 3M, 3C, and 3K. Therefore, the temperature detected by the temperature sensor 82 is used as an index indicating the temperature of each developer.

The electrostatic latent image formed on each photoconductive drum is developed by the developer of a corresponding one of the image creating units 3Y, 3M, 3C, and 3K, so that a toner image of a corresponding color is formed on the photoconductive drum. The toner images thus formed are sequentially transferred with appropriately adjusted timing by the first transfer rollers of the image creating unit 3Y, 3M, 3C, and 3K (in FIG. 1, only the first transfer roller of the image creating unit 3Y bears the reference sign 34Y, whereas the reference signs of the other first transfer rollers are omitted) in the process of first transfer, so that the toner images are layered at the precisely same position on the surface of the intermediate transfer belt 11. Then, in the process of second transfer, the toner images layered on the intermediate transfer belt 11 are transferred all at once onto a recording sheet by the action of the electrostatic force imposed by the second transfer roller 45.

The recording sheet having the toner images transferred thereon is further carried to the fixing device 5 where the unfixed toner images on the recording sheet is heated and pressed to be thermally fixed. The recording sheet is then ejected by a pair of ejecting rollers 71 onto an exit tray 72. Provided near the ejecting roller 71 is a temperature sensor 81 for detecting the temperature in the printer 1 (hereinafter, the temperature may be simply referred to as "printer temperature").

The sheet feeder 4 includes a paper feed cassette 41 for storing recording sheets (denoted by a reference sign S in FIG. 1), a pickup roller 42 that picks up recording sheets from the paper feed cassette 41 one sheet at a time and feeds the recording sheet onto a conveyance path 43, and a pair of timing rollers 44 that adjusts the timing to transport the fed recording sheet to a second transfer position 46.

Note that the number of paper feed cassettes is not limited to one, and a plurality of paper feed cassettes may be provided. Examples of recording sheets include sheets of paper differing in size and thickness (plain paper and thick paper) and film sheets such as OHP film sheets. In the case where a plurality of paper feed cassettes are provided, each cassette may be used to store recording sheets of a specific size, thickness, or material.

The timing roller 44 forwards a recording sheet to the second transfer position 46 with the timing when the toner images transferred to be layered on the intermediate transfer belt 11 in the process of first transfer are carried to the second transfer position 46. At the second transfer position 46, the toner images layered on the intermediate transfer belt 11 are transferred to the recording sheet at once by the second transfer roller 45.

Each roller, including the pickup roller 42 and the pair of timing rollers 44, is powered by a transfer motor (not illustrated) and driven to rotate via power transmission mechanisms, such as gears and belts (not illustrated). Examples of the transfer motor include a stepping motor capable of controlling the rotational speed with high precision.

[2] Structure of Fixing Device

Figure 2:
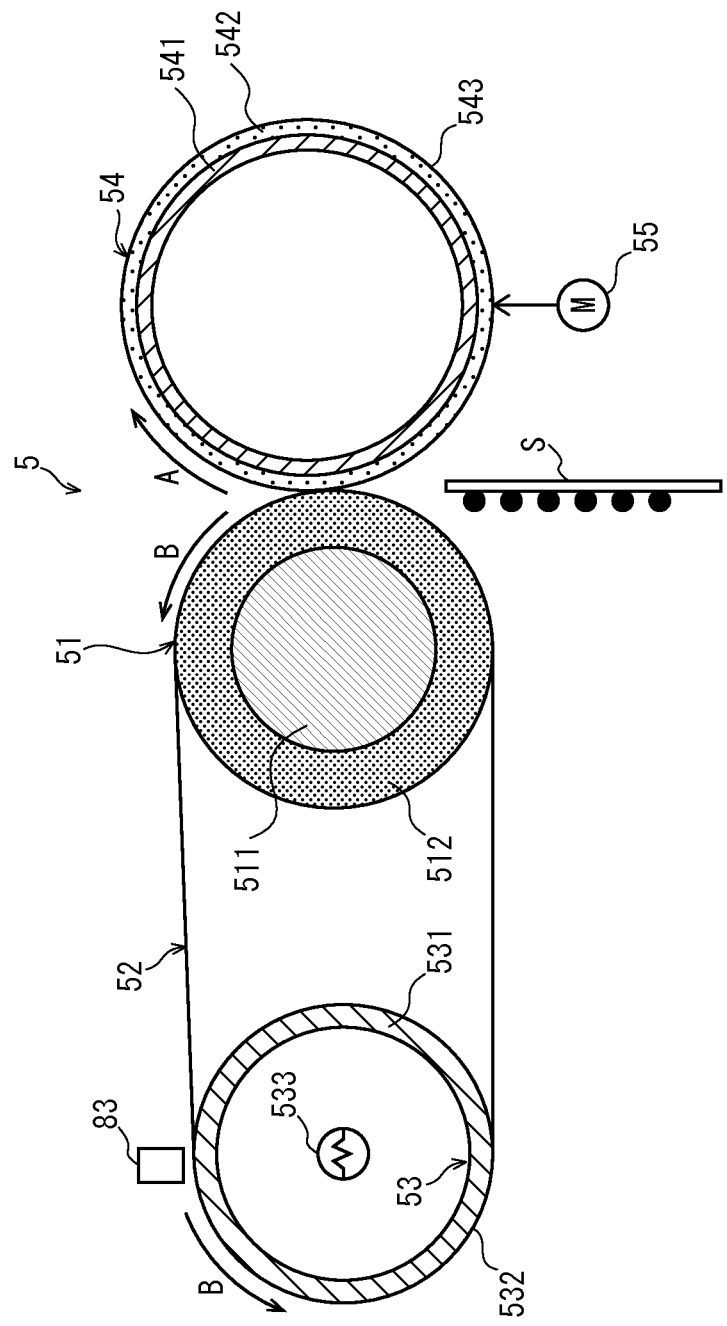
FIG. 2 is a transverse sectional view showing the structure of a fixing device 5.

The following now describes the structure of the fixing device 5. FIG. 2 is a cross-sectional view showing the structure of the fixing device 5. The reference sign S in the figure denotes a recording sheet on which an unfixed image is formed. As shown in the figure, the fixing device 5 includes a fixing roller 51, a heating roller 53, a heating belt 52 wound around the fixing roller 51 and the heating roller 53, a pressing roller 54, and the like. The pressing roller 54 presses the heating belt 52 against the fixing roller 51 to form a fixing nip.

When the pressing roller 54 is driven by a driving motor 55 to rotate in the direction of the arrow A, the fixing roller 51, the heating belt 52, and the heating roller 53 passively rotate in the direction of arrow C. The controller 60 controls the driving motor 55, which in turn controls the rotational speed of the pressing roller 54.

Figure 3:
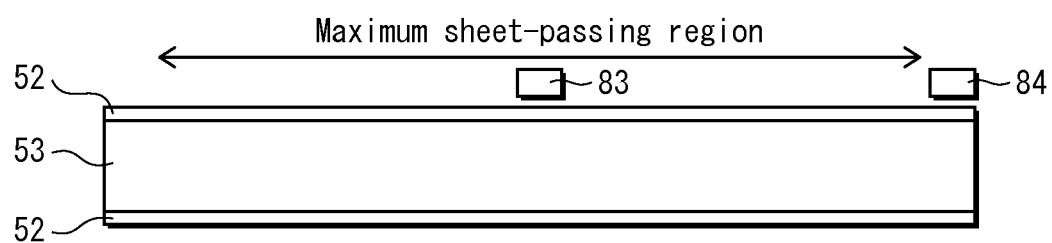
FIG. 3 is a cross-sectional view showing the structure of a heating roller 53 and its surrounding portion shown in FIG. 2.

FIG. 3 is a cross-sectional view showing the structure of the heating roller 53 and its surrounding portion shown in FIG. 2. The range indicated by the double-headed arrow in FIG. 3 corresponds to the maximum sheet-passing region through which a recording sheet pass (here, the maximum sheet-passing region corresponds to the length (longer side) of an A3-size sheet. As shown in the figure, a temperature sensor 83 is provided at a location corresponding to the center of the heating belt 52 in the direction of its rotation axis, and a temperature sensor 84 is provided at a location corresponding to one edge of the heating belt 52 (outside the maximum sheet-passing region). The temperature sensors 83 and 84 detect the temperature of the sheet-passing region and the non-sheet-passing region of the heating belt 52, respectively. The term "sheet-passing region" refers to a region along which recording sheets pass through, and the term "non-sheet-passing region" refers to an edge region along which no recording sheets pass through. The temperature of the non-sheet-passing region is hereinafter referred to as an "edge temperature".

The controller 60 controls the temperature of the heating roller 53 (by turning ON and OFF a heater 533, which will be described later) according to the temperature of the sheet-passing region detected by the temperature sensor 83 so as to maintain the sheet-passing region at a predetermined fixing temperature (170° C., for example).

Referring back to FIG. 2, the fixing roller 51 is composed of a metallic cored bar 511 having the shape of a cylindrical tube and an elastic layer 512 coating the outer circumference of the cored bar 532. The fixing roller 51 is composed of a cylindrical cored bar 511 and an elastic layer 512 around the cored bar 512. In one example, the cored bar 511 measures 2 to 5 mm in thickness, the elastic layer 512 measures 2 to 10 mm in thickness, and the fixing roller 51 measures 20 to 50 nm in outer diameter. Examples of metal usable for the cored bar 511 include aluminum, iron, and SUS (stainless). Examples of an elastic body usable as the elastic layer 512 include silicone rubber and silicone sponge.

The heating belt 52 is a rotating endless belt. In thermal fixing operation, the heating belt 52 heated by the heating roller 53 and comes into contact with a recording sheet S to fuse an unfixed toner image on the recording sheet S. The heating belt 52 is composed of a base layer, an elastic layer, a releasing layer laminated in the stated order. In one example, the heating belt 52 measures 60 to 120 mm in outer diameter, the base layer 521 measures 40 to 150 μm in thickness, the elastic layer 522 measures 100 to 300 μm in thickness, and the releasing layer 523 measures 30 to 50 μm in thickness.

Examples materials usable for the base layer include metal, such as nickel (Ni), heat-resistant resins such as polyimide and polyamide. Examples materials usable for the elastic layer include heat-resistant elastic material, such as silicone rubber. Example materials usable for the releasing layer include fluororesin such as PFA (tetrafluoroethylene perfluoroalkoxy ethylene copolymer), PTFE (tetrafluoroethylene), FEP (tetrafluoroethylene hexafluoroethylene copolymer), and PFEP (tetrafluoroethylene hexafluoropropylene copolymer).

The heating roller 53 is composed of a metallic cored bar 531 having the shape of a hollow cylinder and a coat layer 532 coating the outer circumference of the cored bar 531. The heater 533 is disposed inside (in the hollow interior) of the cored bar 531. In one example, the heating roller 53 measures about 25 mm in outer diameter (the cored bar 531 measures about 1 mm in thickness, and the coat layer 532 measures about 20 μm in thickness). Examples of metal usable for the cored bar 531 include aluminum, iron, and SUS (stainless). The coat layer 532 is provided to prevent wear due the friction against the heating belt 52 and plays the same role as common Teflon coating. As the coat layer 532, PTFE may be used, for example. In one example, the heater 533 is a 999-watt halogen heater lamp with the lamp length of 290 mm.

The pressing roller 54 is composed of a metallic cored bar 541 having the shape of a hollow cylinder, an elastic layer 542 coating the outer circumference of the cored bar 541, and a releasing layer 543 coating the outer circumference of the elastic layer 542. In one example, the pressing roller 54 measures 35 mm in outer diameter (the cored bar 541 measures 2 mm in thickness, the elastic layer 542 measures 4 mm in thickness, and the releasing layer 543 measures about 30 μm in thickness).

Examples of metal usable for the cored bar 541 include aluminum, iron, and SUS (stainless). Examples of a material usable for the elastic layer 542 include elastic materials, such as silicone rubber and silicone sponge. For the releasing layer 543, the same material as the releasing layer 523 of the heating belt 52 can be used.

Although not illustrated, the fixing device 5 also includes a frame that supports the longitudinal ends of each of the fixing roller 51, the heating roller 53, and the pressing roller 54 and that covers such components of the fixing device 5. In addition, the above-described frame of the fixing device 5 has openings provided thereto as necessary. In particular, openings are provided to the frame at positions corresponding to (i) positions at which recording sheets enter/exit the fixing device 5 and (ii) the vicinity of the positions at which the frame supports the longitudinal ends of the fixing roller 51, the heating roller 53, and the pressing roller 54.

[3] Structure of Controller

Figure 4:
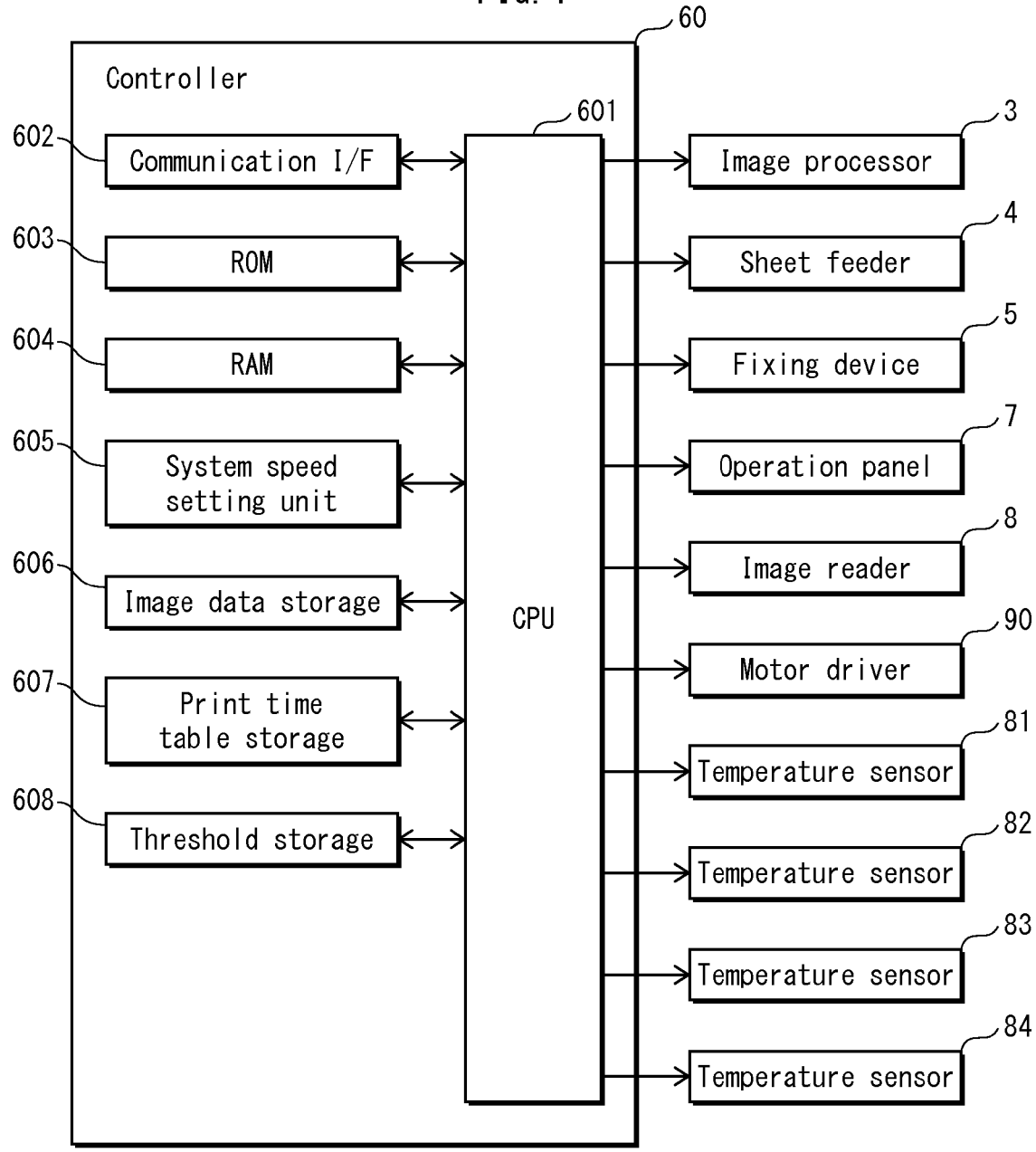
FIG. 4 is a block diagram showing the structure of a controller 60 in relation to major parts controlled by the controller 60.

FIG. 4 is a block diagram showing the structure of the controller 60 in relation to major components controlled by the controller 60. The controller 60 is a common computer. As shown in the figure, the controller 60 includes a central processing unit (CPU) 601, a communication interface (I/F) 602, read only memory (ROM) 603, random access memory (RAM) 604, a system speed setting unit 605, an image data storage 606, a print time table storage 607, and a threshold storage 608.

The communication I/F 602 is an interface for connection to a LAN through a LAN card or LAN board. The ROM 603 stores programs used for controlling the image processor 3, the sheet feeder 4, the fixing device 5, the operation panel 7, an image reader 8, a motor driver 90, the temperature sensors 81-84. The ROM 603 also stores programs used for executing the delay-process-start control processing and system speed control processing both of which will be described later. The RAM 604 is used by the CPU 601 as a work area at the time of program execution.

The system speed setting unit 605 controls the motor driver 90 to effect the system speed control. The term "system speed" refers to the rotational speed of the photoconductive drums for the respective colors, the running speed of the intermediate transfer belt 11, or the like. By controlling the system speed, the print speed (the number of prints per unit time) is controlled.

The system speed setting unit 605 can change the system speed by controlling the motor driver 90 to change the rotational speed of the driving motor, which acts as the drive source. In this embodiment, the system speed can be changed in three steps, namely 185 mm/sec, 167 mm/sec, 148 mm/sec, and the default system speed is set to 185 mm/sec. The system speed of 185 mm/sec yields the print speed of 30 sheets/min, the system speed of 167 mm/sec yields the print speed of 27 sheets/sec, and the system speed of 148 mm/sec yields the print speed of 24 sheets/sec.

The image data storage 606 stores image data for printing. The stored image data is input via the communication I/F 602 or the image reader 8. The print time table storage 607 stores a plurality of (three in this embodiment) different print time tables. The term "print time table" refers to a table showing the relationship between the number of prints and the print time in print operation executed at each of the selectable system speeds to produce images in the multi-color mode on recording sheets of a predetermined size and type (A4-size plain paper in this embodiment), provided that the print operation is started after the switch-on and completion of the warm-up of the fixing device 5. The print time tables are prepared in advance by the manufacturer of the printer 1.

The relationship between the number of prints and the print time changes depending on whether a delay process is executed. The delay process is to slow down print operation by suspending the print operation or by lengthening the time intervals between the successive formations of images to be transferred onto the recording sheets (hereinafter, "image forming intervals"). If a delay process is started, the print time per sheet becomes longer than that before the start of the delay process. The timing at which a delay process is executed (the number of prints produced before the start of the delay process) differs depending on the type of an event that triggers the delay process, namely "excessive rise in the edge temperature", "excessive rise in the developer temperature", and "excessive rise in the temperature of recording sheets in the exit tray 72 (hereinafter, simply "recording sheet temperature")". Therefore, the print time tables are prepared for the respective event types and stored in the print time table storage 607.

The "excessive rise in the edge temperature" tends to occur when recording sheets that are narrower in width than the maximum sheet-passing region (which is the length of A3 size sheet in this example) in the direction of the rotation axis are successively passed along the heating belt 52 (when A4-size sheets are successively passed in portrait orientation). The reason why the temperature rise tends to occur is as follows. When contacting the sheet-passing region, the recording sheets lowers the temperature of the sheet-passing region. The controller 60 thus executes control to heat the entire heating belt 52 so as to maintain the sheet-passing region at the fixing temperature (170° C., for example). As a result, the temperature of the non-sheet-passing regions of the heating belt 52 elevates.

Contact between a recording sheet and the sheet-passing region occurs more frequently as the print speed increases, so that the decrease in the temperature of the sheet-passing region is accordingly greater. The controller 60 thus causes the entire heating belt 52 to be heated to a greater extent. As a result, the increase in the temperature in the non-sheet-passing regions is greater, which leads to an excessive rise in the edge temperature. Leaving the temperature rise unattended may result in problems, such as thermal deterioration of the parts positioned near the heating belt 52.

In view of the above, the controller 60 performs delay-process-start control processing, details of which will be described later. In the delay-process-start control processing, the controller 60 monitors the edge temperature using the temperature sensor 84 to perform a delay process of lengthening the image forming intervals by a predetermined time period when the edge temperature exceeds a permissible threshold (230° C., for example). In this embodiment, the delay process is performed to lower the print speed corresponding to the default system speed (30 sheets/min) to half (15 sheets/min) by lengthening the image forming intervals. This delay process is hereinafter referred to as an "interval-control delay process".

FIG. 5 is a specific example of a print time table for edge temperature rise used when a delay process is executed as a result of an excessive temperature rise at an edge portion of the heating belt 52 as described above (hereinafter, this table is referred to as an "edge-temperature-rise print time table").

Specifically, the edge-temperature-rise print time table is prepared in advance by checking time-varying change of the relationship between the number of prints and the print time in the following manner and under the condition controlled not to cause any delay process other than the interval-control delay process: The printer 1 performs print operation of successively printing multi-color images on recording sheets of a predetermine size and type (A4-size plain paper in this embodiment) at each of the selectable system speeds (185 mm/sec, 167 mm/sec, and 148 mm/sec which correspond to the print speeds of 30 sheets/min, 27 sheets/min, and 24 sheets/min, respectively), provided that the pint operation is started after the switch-on and completion of the warm-up of the fixing device 5.

Figure 6:
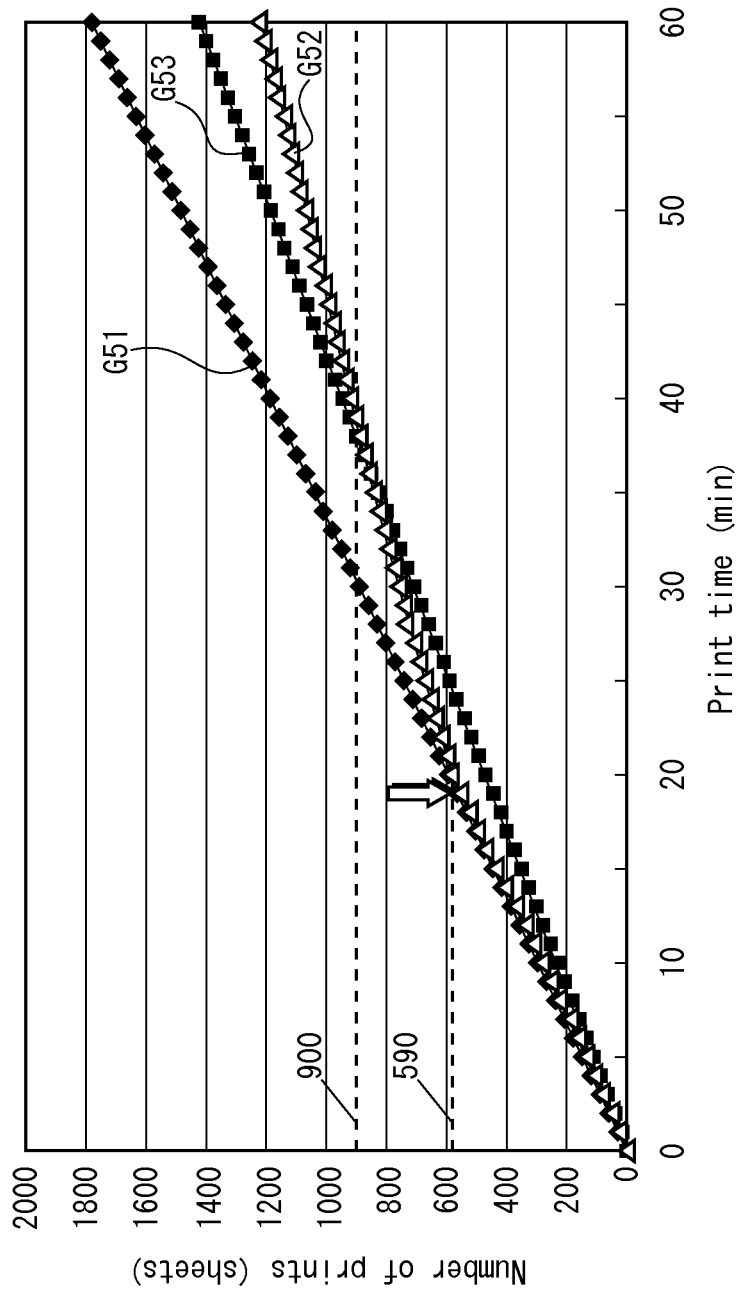
FIG. 6 is a graph plotting the relationships between the number of prints and the print time at the system speed of 185 mm/sec and at the system speed of 148 mm/sec (from among the relationships between the number of prints and the print time shown in FIG. 5) to show change in the respective relationships over time.

FIG. 6 is a graph plotting the relationship between the number of prints and the print time at the system speed of 185 mm/sec and at the system speed of 148 mm/sec, from among the relationships between the number of prints and the print time shown in FIG. 5. In the figure, the reference sign G51 denotes a curve showing the time-varying change of the relationship between the number of prints and the print time when the print operation is executed at the system speed 185 mm/sec continually without an interval-control delay process.

The reference sign G52 denotes a curve representing the time-varying change of the relationship between the number of prints and the print time when the print operation is executed at the system speed of 185 mm/sec. The reference sign G53 denotes a curve representing the time-varying change of the relationship between the number of prints and the print time when the print operation is executed at the system speed of 148 mm/sec. In the figure, an open arrow indicates a point in time at which the interval-control delay process is started in the print operation represented by the curve G52 (in this figure, the interval-control delay process is started when the number of prints reaches 590). In the print operation represented by the curve G53, the interval-control delay process is not started yet as of the print time of 60 minutes.

As shown in the figure, no interval-control delay process is performed in the print operation represented by the curve G52 until the number of prints reaches 590. Therefore, the curves G51 and G52 show the same relationship between the number of prints and the print time (such that the number of prints increases by 30 sheets per minute of the printing time). Yet, once the number of prints reaches 590 and the interval-control delay process is started in the print operation represented by the curve G52, the print speed decreases (such that the number of prints increases only 15 per minute of the print time). Therefore, the respective relationships shown by the curves G51 and G52 no longer match. That is, the print operation involving the interval-control delay process takes longer to finish the same number of prints than the print operation without the interval-control delay process.

During the interval-control delay process, the print speed (15 sheets/min) is lower than that corresponding to the minimum system speed of 148 mm/sec (24 sheets/min). Therefore, until the interval-control delay process starts in the print operation represented by the curve G53, the print operation represented by the curve G53 is executed at the print speed higher than the print speed of the print operation represented by the curve G52. That is, during the time between the start of the interval-control delay process in the print operation represented by the curve G52 and the start of the interval-control delay process in the print operation represented by the curve G53, there may be a case where the print operation represented by the curve G53 takes shorter to finish printing, depending on the number of prints (the number of prints exceeding 590, which triggers the interval-control delay process in the print operation represented by the curve G52).

In the example shown in FIG. 6, the print operation represented by the curve G53 takes shorter than the print operation represented by the curve G52 to finish the same number of prints exceeding 900. In the figure, the interval-control delay process is not started in the print operation represented by the curve G53 even after the number of prints exceeds 1400. Yet, regardless of whether or not the interval-control delay process starts thereafter, the print operation represented by the curve G53 still takes shorter than the print operation represented by the curve G52. This is because the print speed during the interval-control delay process is 15 sheets/min, which is the same as the print speed of the print operation represented by the curve G52 in which the interval-control delay process has already started.

As clarified above, until the interval-control delay process is started, the print time is shorter as the initial system speed is higher. Yet, once the interval-control delay process is started, the relationship between the number of prints and the print time changes and the print speed is greatly reduced. Thus, there may be a case where selecting a slower system speed at the start of print operation ultimately reduces the overall print time and increases the print operation productivity.

Therefore, as in the present embodiment, by preparing the edge-temperature-rise print time table in advance and store it in the print time table storage 607, the system speed can be optimally determined according to the number of prints designated in a print job to ensure that the print time taken to produce the print job is made shortest. A "print job" is composed of print control information and image data to be printed. The print control information includes information specifying the number of prints to be produced, and information specifying the print condition, such as the print mode (two-sided printing, single-sided printing, single-color (monochrome) printing, multi-color printing, and the like), the size of recording sheets, and the type of recording sheets.

Reference is now made to the "excessive rise in the developer temperature" which tends to occur when the printer temperature is elevated high. For example, in execution of a print job of producing a large number of prints, thermal fixing operation is performed in succession for a relatively long period of time. As a result, the printer temperature rises to cause an excessive rise in the developer temperature. Such a high temperature in the developers causes fusing and sticking of the toner in the developers, which leads to problems such as degraded quality of resulting images.

In view of the above, the controller 60 performs delay-process-start control processing, details of which will be described later. In the delay-process-start control processing, the controller 60 monitors the index indicating the temperature in the respective developers of the image creating units 3Y, 3M, 3C, and 3K by using the temperature sensor 84 and performs a delay process when the index exceeds a permissible threshold (40° C., for example). In this embodiment, the delay process is performed by repeatedly suspending the print operation for a predetermined time period (1 minutes, for example) and resuming the print operation at the system speed initially set at the start of the print job. This delay process is hereinafter referred to as an "suspend-control delay process".

FIG. 7 is a specific example of a print time table used when a delay process is executed as a result of an excessive rise in the developer temperature (hereinafter, this table is referred to as a "developer-temperature-rise print time table").

Specifically, the developer-temperature-rise print time table is prepared in advance by checking time-varying change of the relationship between the number of prints and the print time in the following manner and under the condition controlled not to cause any delay process other than the suspend-control delay process: The printer 1 performs print operation of successively printing multi-color images at each of the selectable system speeds (185 mm/sec, 167 mm/sec, and 148 mm/sec which correspond to the print speeds of 30 sheets/min, 27 sheets/min, and 24 sheets/min, respectively), provided that the print operation is started after the switch-on and completion of the warm-up of the fixing device 5.

Figure 8:
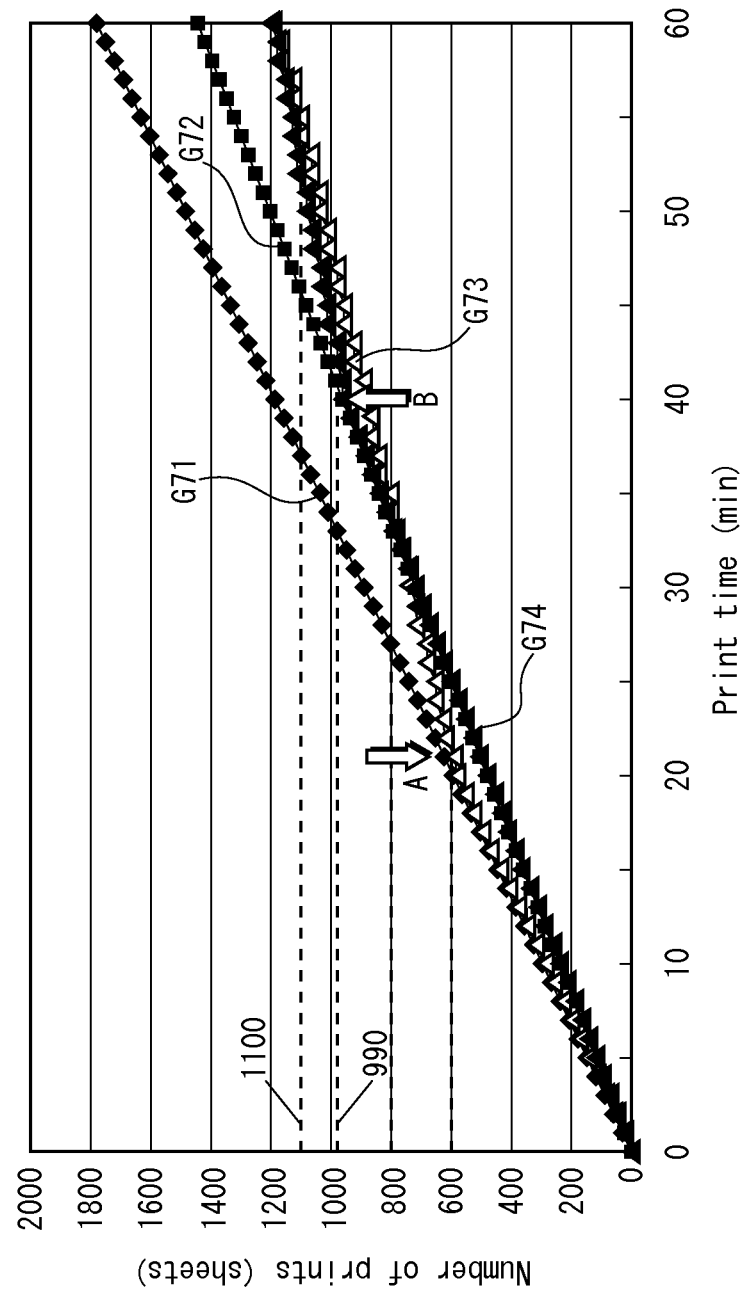
FIG. 8 is a graph plotting the relationships between the number of prints and the print time at the system speed of 185 mm/sec and at the system speed of 148 mm/sec (from among the relationships between the number of prints and the print time shown in FIG. 7) to show change in the respective relationships over time.

FIG. 8 is a graph plotting the relationship between the number of prints and the print time at the system speed of 185 mm/sec and at the system speed of 148 mm/sec, from among the relationships between the number of prints and the print time shown in FIG. 7. In the figure, the reference sign G71 denotes a curve showing the time-varying change of the relationship between the number of prints and the print time when the print operation is executed at the system speed of 185 mm/sec continually without an suspend-control delay process. The reference sign G72 denotes the time-varying change of the relationship between the number of prints and the print time when the print operation is executed at the system speed of 148 mm/sec continually without an suspend-control delay process. The reference sign G73 denotes a curve showing the time-varying change of the relationship between the number of prints and the print time when the print operation is executed at the system speed of 185 mm/sec. The reference sign G74 denotes the time-varying change of the relationship between the number of prints and the print time when the print operation is executed at the system speed of 148 mm/sec.

In the figure, a down-pointing open arrow A indicates a point in time at which the suspend-control delay process is started in the print operation represented by the curve G73 (in this figure, the suspend-control delay process is started when the number of prints reaches 600), and an up-pointing open arrow B indicates a point in time at which the suspend-control delay process is started in the print operation represented by the curve G74 (in this figure, the suspend-control delay process is started when the number of prints reaches 990).

As shown in the figure, when the print operation is performed at the system speed of 185 mm/sec, no suspend-control delay process is performed in the print operations represented by the curve G71 and G73 until the number of prints reaches 600. Therefore, the curves G71 and G73 show the same relationship between the number of prints and the print time (such that the number of prints increases by 30 sheets per minute of the print time). Yet, once the number of prints reaches 600 and the suspend-control delay process is started in the print operation represented by the curve G73, the print speed decreases (such that the number of prints increases only 13 per minute of the print time). Therefore, the respective relationships shown by the curves G71 and G73 no longer match. That is, the print operation involving the suspend-control delay process takes longer to finish the same number of prints than the print operation without the suspend-control delay process.

When the print operation is performed at the system speed of 148 min/sec, no suspend-control delay process is performed in the print operations represented by the curve G72 and G74 until the number of prints reaches 990. Therefore, the curves G72 and G74 show the same relationship between the number of prints and the print time (such that the number of prints increases by 24 sheets per minute of the print time). Yet, once the number of prints reaches 990 and the suspend-control delay process is started in the print operation represented by the curve G74, the print speed decreases. Therefore, the respective relationships shown by the curves G72 and G74 no longer match. That is, the print operation involving the suspend-control delay process takes longer to finish the same number of prints than the print operation without the suspend-control delay process.

During the suspend-control delay process, the print speed (13 sheets/min) at which the print operation represented by the curve G73 is lower than that corresponding to the minimum system speed of 148 mm/sec (24 sheets/min). Therefore, during the time between the start of the suspend-control delay process in the print operation represented by the curve G73 and the start of the suspend-control delay process in the print operation represented by the curve G74, the print operation represented by the curve G74 is executed at the print speed higher than that of the print operation represented by the curve G73. Therefore, during this time, there may be a case where the print operation represented by the curve G74 without the suspend-control delay process takes shorter to finish printing than the print operation represented by the curve G73, depending on the number of prints.

Yet, once the number of prints reaches 990 and the suspend-control delay process is started also in the print operation represented by the curve G74, the print speed of the print operation represented by the curve G74 becomes lower than that of the print operation represented by the curve G73 because the corresponding system speed (148 mm/sec) during the non-suspended periods of the print operation is lower than that corresponding to the print operation represented by the curve G74 (185 mm/sec).

As shown in FIG. 8, for the number of prints ranging from 800 to 1100, the print operation represented by the curve G74 takes shorter to finish the same number of prints than the print operation represented by the curve G73. For the number of prints exceeding 1100, there is no difference in the print time taken to produce the same number of prints by the respective print operations.

As clarified above, until the suspend-control delay process is started, the print time is shorter as the initial system speed is higher. Yet, once the suspend-control delay process is started, the print time taken to finish the print operation at the respective system speeds vary depending on the number of prints to be produced. Therefore, by preparing the developer-temperature-rise print time table in advance and store it in the print time table storage 607 as in the present embodiment, the system speed is optimally determined according to the number of prints designated in a print job to ensure that the print time taken to finish the print job is made shortest.

Reference is now made to the "excessive rise in the recording sheet temperature" which tends to occur in the two-sided printing mode, which involves forming toner images on both sides of each recording sheet. The risk of excessive rise in the recording sheet temperature increases with an increase in the system speed and a corresponding increase in the print speed. A higher print speed means that recording sheets are ejected into the exit tray 72 at shorter intervals. That is, the recording sheets are stacked and kept out of contact with ambient air before being sufficiently cooled through contact with ambient air. Therefore, heat of the recording sheets cannot be dissipated easily, and the recording sheet temperature tends to be excessively high. As a result, an undesirable phenomenon called "tacking" tends to occur, in which the toner thermally fixed on a recording sheet is fused to tack the recording sheet to another recording sheet.

In view of the above, the controller 60 performs delay-process-start control processing, details of which will be described later. In the delay-process-start control processing, the controller 60 monitors the number of prints in each print job designating the two-sided printing mode as the index indicating the recording sheet temperature and performs a delay process when the index exceeds a permissible threshold (80, for example). In this embodiment, the delay process performed here is an interval-control delay process similarly to that trigged by an excessive rise in the edge temperature.

FIG. 9 is a specific example of a print time table used when an interval-control delay process is executed as a result of an excessive temperature rise of recording sheets (hereinafter, this table is referred to as a "sheet-temperature-rise print time table").

Specifically, the sheet-temperature-rise print time table is prepared in advance by checking time-varying change of the relationship between the number of prints and the print time in the following manner and under the condition controlled not to cause any delay process other than the interval-control delay process due to an excessive rise in the recording sheet temperature: The printer 1 performs print operation of successively printing multi-color images on recording sheets of a predetermine size and type (A4-size plain paper in this embodiment) at each of the selectable system speeds (185 mm/sec, 167 min/sec, and 148 mm/sec which correspond to the print speeds of 30 sheets/min, 27 sheets/min, and 24 sheets/min, respectively), provided that the print operation is stated after the switch-on and completion of the warm-up of the fixing device 5.

Figure 10:
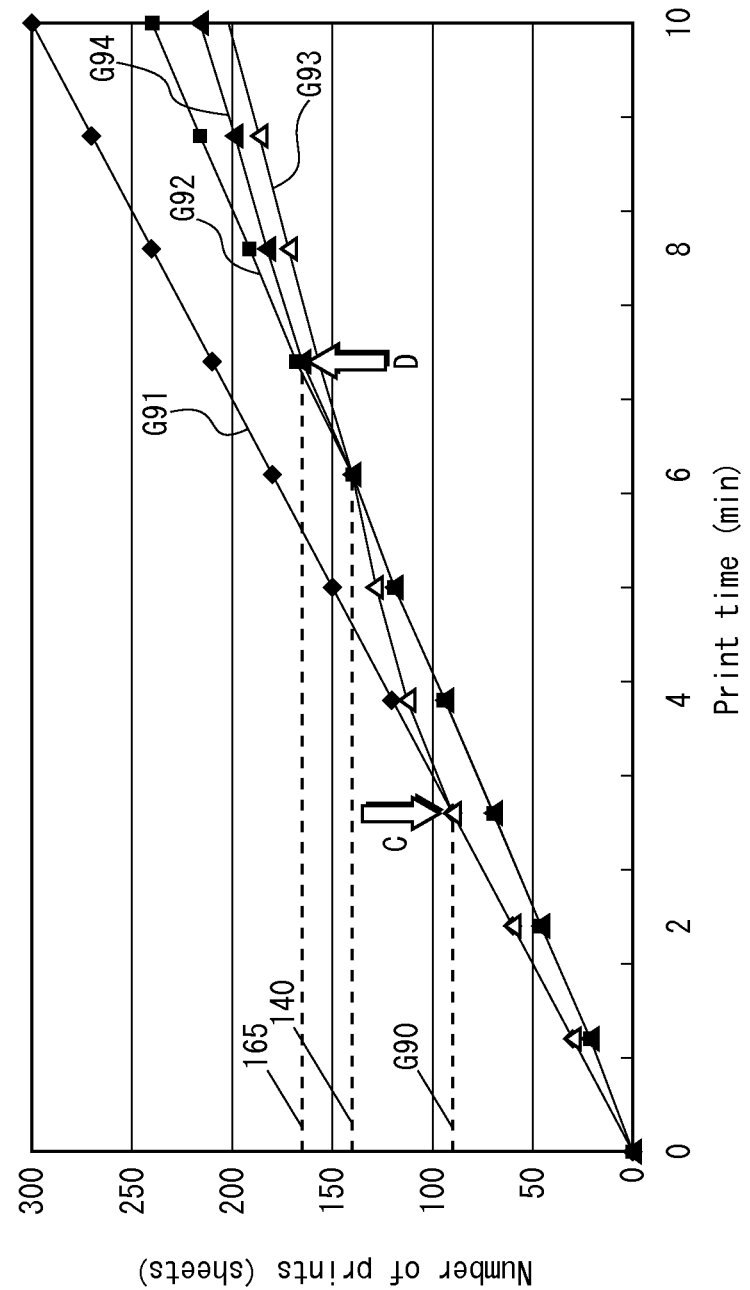
FIG. 10 is a graph plotting the relationships between the number of prints and the print time at the system speed of 185 mm/sec and at the system speed of 148 min/sec (from among the relationships between the number of prints and the print time shown in FIG. 9) to show changes in the respective relationships over time.

FIG. 10 is a graph plotting the relationships between the number of prints and the print time at the system speed of 185 mm/sec and at the system speed of 148 mm/sec (from among the relationships between the number of prints and the print time shown in FIG. 9) to show changes in the respective relationships over time. In the figure, the reference sign G91 denotes a curve showing the time-varying change of the relationship between the number of prints and the print time when the print operation is executed at the system speed of 185 mm/sec continually without an interval-control delay process. The reference sign G92 denotes the time-varying change of the relationship between the number of prints and the print time when the print operation is executed at the system speed of 148 mm/sec continually without an interval-control delay process. The reference sign G93 denotes a curve representing the time-varying change of the relationship between the number of prints and the print time when the print operation is executed at the system speed of 185 mm/sec.

The reference sign G94 denotes a curve representing the time-varying change of the relationship between the number of prints and the print time when the print operation is executed at the system speed of 148 mm/sec.

In the figure, a down-pointing open arrow C indicates a point in time at which the interval-control delay process is started in the print operation represented by the curve G93 (in this figure, the suspend-control delay process is started when the number of prints reaches 90), and an up-pointing open arrow D indicates a point in time at which the interval-control delay process is started in the print operation represented by the curve G94 (in this figure, the suspend-control delay process is started when the number of prints reaches 165).

As shown in the figure, no interval-control delay process is performed in the print operation represented by the curve G93 until the number of prints reaches 90. Therefore, the curves G91 and G93 show the same relationship between the number of prints and the print time (such that the number of prints increases by 30 sheets per minute of the print time). Yet, once the number of prints reaches 90 and the interval-control delay process is started in the print operation represented by the curve G93, the print speed decreases (such that the number of prints increases only 15 per minute of the print time). Therefore, the respective relationships shown by the curves G91 and G93 no longer match. That is, the print operation involving the interval-control delay process takes longer to finish the same number of prints than the print operation without the interval-control delay process.

During the interval-control delay process, the print speed (15 sheets/min) is lower than that corresponding to the minimum system speed of 148 mm/sec (24 sheets/min). Since the interval-control delay process in the print operation represented by the curve G93 starts when the number of prints reaches 90, the following may be true for the number of prints exceeding 90, similarly to the interval-control delay process triggered by an excessive rise in the edge temperature. That is, there may be a case where the print operation represented by the curve G94 takes shorter to finish the same number of prints than the print operation represented by the curve G93. This is because the interval-control delay process in the print operation represented by the curve G94 starts later (when the number of prints reaches 165).

In the example shown in FIG. 10, the print operation represented by the curve G94 takes shorter than the print operation represented by the curve G93 to finish the same number of prints exceeding 140. Once the number of prints reaches 165, the interval-control delay process is started also in the print operation represented by the curve G94. Yet, the print operation represented by the curve G94 still takes shorter than the print operation represented by the curve G93 to finish the same number of prints. It is because the print speed during the interval-control delay process is 15 sheets/min, which is the same as the print speed of the print operation represented by the curve G93 in which the interval-control delay process has already started.

Similarly to what is described regarding the excessive rise in the edge temperature, there may be a case where selecting a lower system speed at the start of print operation ultimately leads ultimately reduces the overall print time and increases the print operation productivity.

As clarified above, by preparing the print time tables (namely, the edge-temperature-rise print time table, the developer-temperature-rise print time table, the sheet-temperature-rise print time table) in advance and store them in the print time table storage 607 as in the present embodiment, the system speed is optimally determined according to the number of prints designated in a print job to ensure that the print time taken to finish the print job is made shortest.

Referring back to FIG. 4, the threshold storage 608 stores various thresholds used in the delay-process-start control processing and the system speed control processing, details of both will be described later. In particular, the threshold storage 608 stores permissible thresholds 1, 2, and 3 used in the delay-process-start control processing. The permissible threshold 1 is used as a criterion for determining whether or not to start a delay process triggered by an excessive rise of the recording sheet temperature (hereinafter, this delay process is referred to as a "first temperature-rise delay process"). The permissible threshold 2 is used as a criterion for determining whether or not to start a delay process triggered by an excessive rise in the edge temperature (hereinafter, this delay process is referred to as a "second temperature-rise delay process"). The permissible threshold 3 is used as a criterion for determining whether or not to start a delay process triggered by an excessive rise in the developer temperature (hereinafter, this delay process is referred to as a "third temperature-rise delay process").

In addition, the threshold storage 608 stores thresholds 1, 2, and 3 of the number of prints used in the system speed control processing, details of which will be described later. In particular, the thresholds 1, 2, and 3 are respectively used as the criteria for determining whether or not to start the first, second, and third temperature-rise delay processes during a print job that is started at the default system speed (185 mm/sec).

The CPU 601 executes various programs stored on the ROM 602 to control the image processer 3, the sheet feeder 4, the fixing device 5, the operation panel 7, the image reader 8, the motor driver 90, the temperature sensors 81-84, and the like, and also to perform the delay-process-start control processing and the system speed control processing, details of both will be described later.

The operation panel 7 is provided with a plurality of input keys and a liquid crystal display overlaid with a touch panel. In response to a touch operation on the touch panel or to a key operation on an input key, the operation panel 7 passes a corresponding user instruction to the controller 60. The image reader 8 includes an image input device such as a scanner and the like. The image reader 8 reads information such as characters and figures printed on a recording sheet, such as a sheet of paper, and thereby forms image data.

The motor driver 90 drives a driving motor, which is a drive source for rotating the respective photoconductive drums and running the intermediate transfer belt 11.

[4] Delay-Process-Start Control Processing

Figure 11:
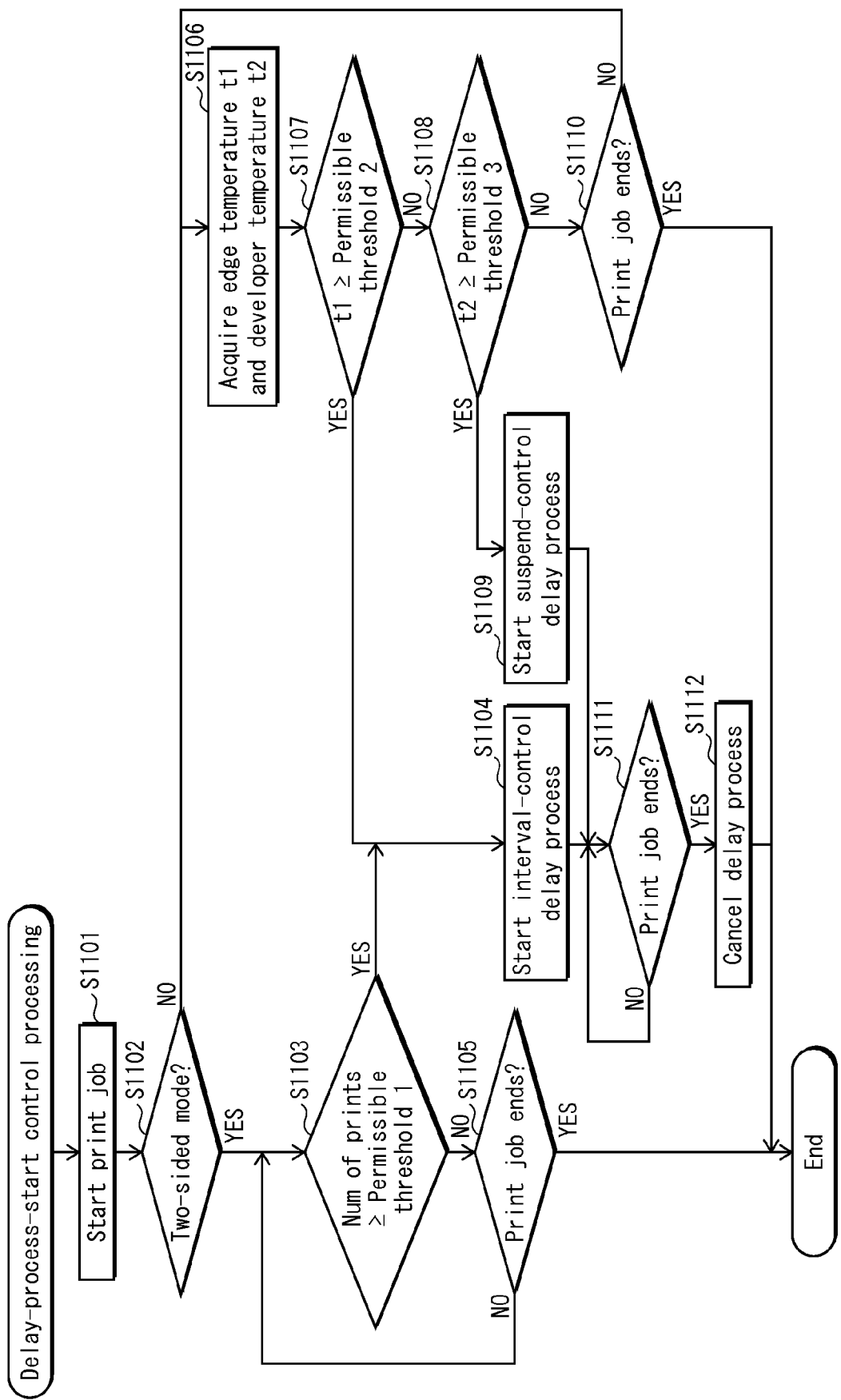
FIG. 11 is a flowchart of delay-process-start control processing performed by the controller 60.

The following describes operations involved in the delay-process-start control processing performed by the controller 60. FIG. 11 is a flowchart illustrating the operations mentioned above. Upon starting a print job (Step S1101), the controller 60 judges whether or not the print condition of the print job designates a two-sided printing mode (Step S1102).

When the two-sided printing mode is designated (Step S1102: Yes), the controller 60 keeps the count of the number of prints having been produced in the current print job and judges whether or not the count has reached the permissible threshold 1 (80, for example) (Step S1103). The permissible threshold 1 is set to the maximum number of prints up to which no tacking is expected to occur in the recording sheets ejected into the exit tray 72, provided that multi-color images are printed in the two-sided printing mode at the default system speed (185 min/sec). The maximum number of prints is empirically set in advance by the manufacture of the printer 1.

When the number of prints has reached the permissible threshold 1 (Step S1103: Yes), the controller 60 starts the interval-control delay process (Step S1104). If not (Step S1103: No), Step S1103 is repeated until the print job ends (Step S1105: Yes).

On the other hand, when the judgment in Step S1102 results in the negative (Step S1102: No), the controller 60 acquires the edge temperature t1 from the temperature sensor 84 and the index t2 indicating the temperature in the developers from the temperature sensor 82 (Step S1106). The controller 60 then judges whether the value of t1 has reached the permissible threshold 2 (230° C., for example) (Step S1107) and whether the value of t2 has reached the permissible threshold 3 (40° C., for example) (Step S1108). Note that the permissible threshold 2 is set to the maximum temperature up to which no thermal damage is expected to be caused to the parts or the like positioned near the heating belt 52. The maximum temperature of prints is empirically set in advance by the manufacture of the printer 1.

The permissible threshold 3 is set to the maximum temperature up to which no fusing and sticking of the toner in the developers is expected. The maximum temperature of prints is empirically set in advance by the manufacture of the printer 1.

When the value of t1 has reached the permissible threshold 2 (Step S1107: Yes), the controller 60 performs an interval-control delay process (Step S1104). Alternatively, when the value of t2 has reached the permissible threshold 3 (Step S1107: No and Step S108: Yes), the controller 60 performs a suspend-control delay process (Step S1109). When the print job ends (Step S1111: Yes), the controller 60 cancels the delay process performed in Step S1104 or S1109 (Step S1112).

When the judgments in Steps S1107 and S1108 both result in the negative (Step S1107: No and Step S1108: No), the controller 60 repeats the series of steps from S1106 to S1108 until the print job ends (Step S1110: Yes).

[5] System Speed Control Processing

Figure 12:
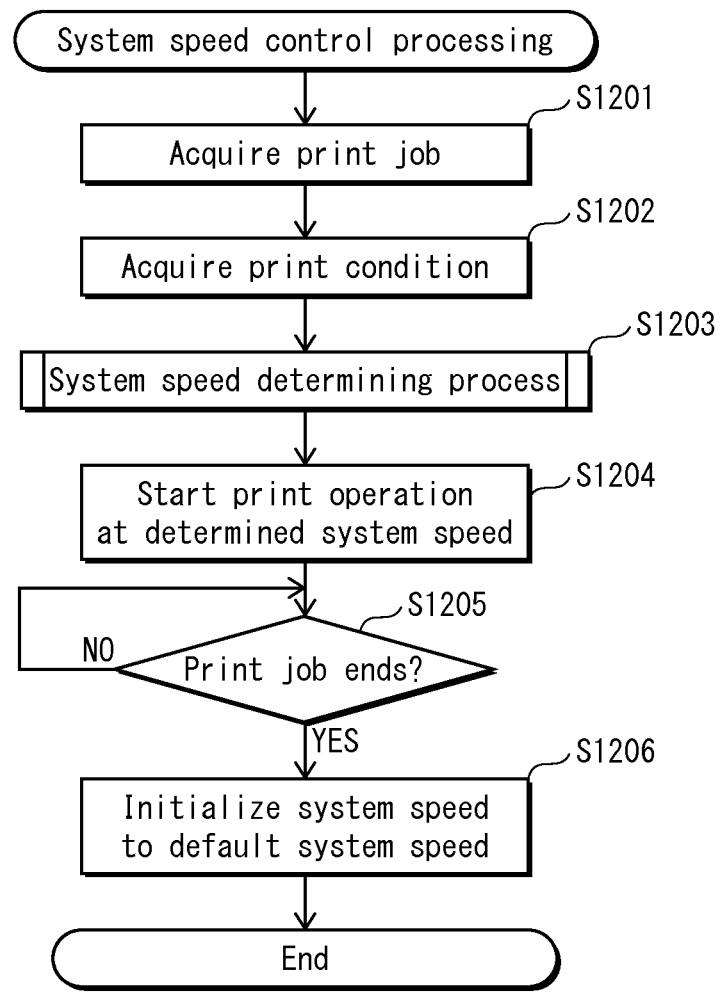
FIG. 12 is a flowchart of system speed control processing performed by the controller 60.

Next, the following describes operations involved in the system speed control processing performed by the controller 60. FIG. 12 is a flowchart illustrating the operations mentioned above. On receiving a print job (Step S1201), the controller 60 acquires the print condition from the print job (Step S1202) and performs the later-described steps of the system speed determining process (Step S1203).

The controller 60 then causes the image processor 3 to start the print operation at the system speed determined through the system speed determining process (Step S1204). When the print job ends (Step S1205: Yes), the controller 60 initializes the system speed to the default speed (Step S1206).

Figure 13:
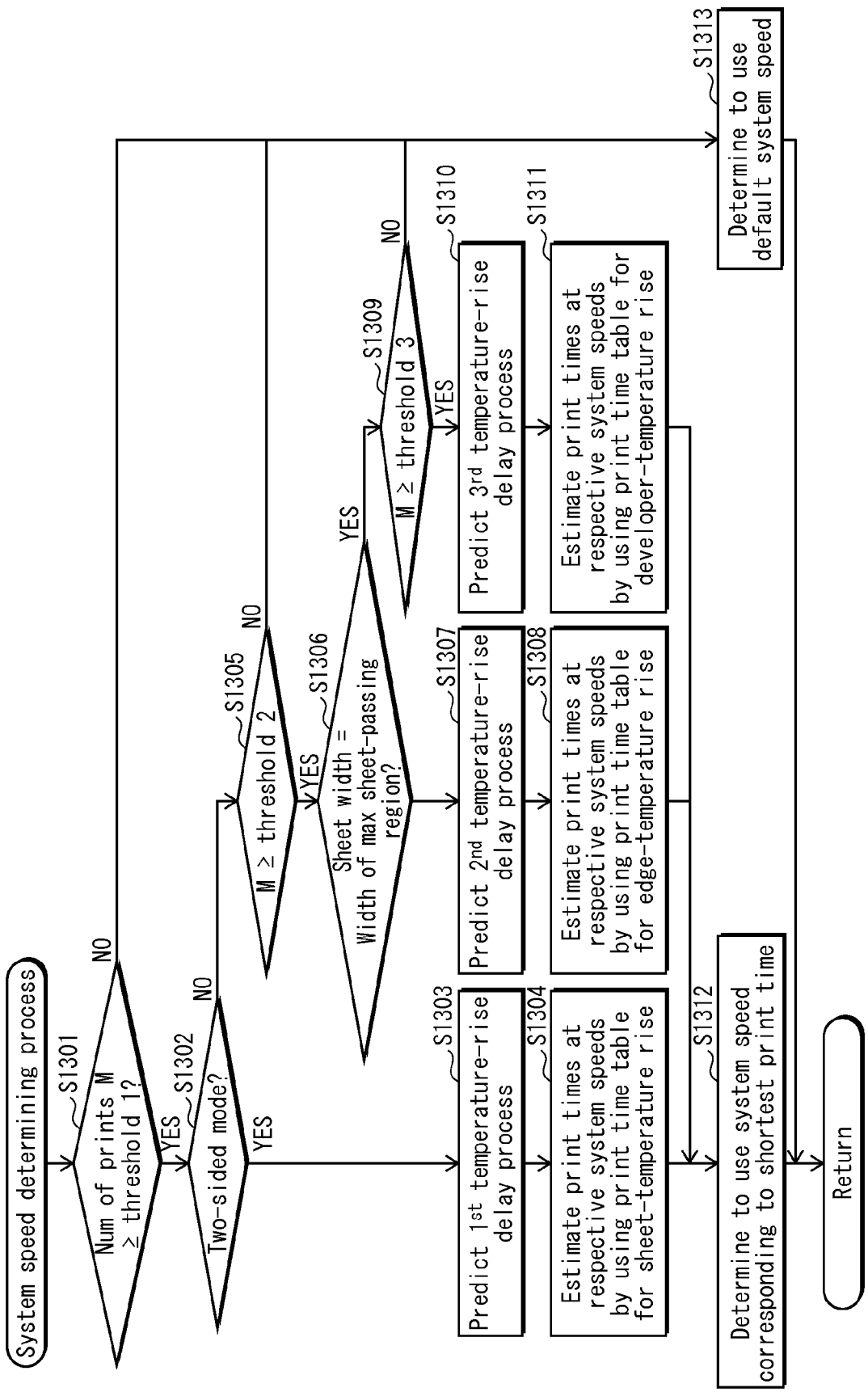
FIG. 13 is a flowchart of system speed determining process performed by the controller 60.

FIG. 13 is a flowchart of operations involved in the system speed determining process performed by the controller 60. The controller 60 judges whether the number of prints (M) designed in the print job is equal to the threshold 1 or greater (Step S1301). In this example, the threshold 1 is set to the value equal to the permissible threshold 1 (80 in this example). When the value of M is equal to the threshold 1 or greater (Step S1301: Yes), the controller 60 further judges whether the print condition designates the two-sided printing mode (Step S1302). If the two-sided printing mode is designated (Step S1302: Yes), the controller 60 predicts that execution of the print job at the default system speed will cause a first temperature-rise delay process to be started before completion of the print job (Step S1303).

The controller 60 then acquires the sheet-temperature-rise print time table from the print time table storage 607 and estimates the print times expected to be taken to produce the number of prints designated in the print job at the respective system speeds (namely, 185 mm/sec, 167 mm/sec, and 148 mm/sec) with reference to the thus acquired sheet-temperature-rise print time table (Step S1304).

The controller 60 further selects the system speed corresponding to the shortest print time from among the respective print times estimated as the initial system speed at which the print job is to be started (Step S1312).

When the judgment in Step S1302 results in the negative (Step S1302: No), the controller 60 judges whether the value of M is equal to the threshold 2 or greater (Step S1305). Note that the threshold 2 is set to the number of prints (590, in this example) that causes the edge temperature to reach the maximum temperature (the permissible threshold 2) up to which no thermal damage is expected to the parts or the like positioned near the heating belt 52, provided that print operation is successively executed in the multi-color mode (in this case the print operation of successively producing multi-color images onto A4-size recording sheets at the default system speed). The threshold 2 is empirically set in advance by the manufacture of the printer 1.

When the value of M is equal to the threshold 2 or greater (Step S1305: Yes), the controller 60 judges whether or not the recording sheet width designed in the print condition in the direction of the rotation axis matches the width of the maximum sheet-passing region (Step S1306).

In this example, the judgment in Step S1306 is made based on whether or not the recording sheet size designated in the print condition is an A3 landscape size. When a A3 landscape size is designated, the judgment results in the affirmative.

When the judgment in Step S1306 results in the negative (Step S1306: No), the controller 60 predicts that execution of the print job at the default system speed will cause a second temperature-rise delay process to be started before completion of the print job (Step S1307).

The controller 60 then acquires the edge-temperature-rise print time table from the print time table storage 607 and estimates the print times expected to be taken to finish the print job acquired in Step S1201 at the respective system speeds (namely, 185 mm/see, 167 mm/sec, and 148 mm/sec), with reference to the thus acquired edge-temperature-rise print time table (Step S1308). Then, the processing moves onto Step S1312.

When the judgment in Step S1306 results in the affirmative (Step S1306: Yes), the controller 60 judges whether the value of M is equal to the threshold 3 or greater (Step S1309). Note that the threshold 3 is set to the number of prints (600, in this example) that causes the developer temperature to reach the maximum temperature (permissible threshold 3) up to which no fusing and sticking of the toner in the developers is expected to occur, provided that print operation is successively executed in the multi-color mode (in this case the print operation of successively producing multi-color images onto A4-size recording sheets at the default system speed). The threshold 3 is empirically set in advance by the manufacture of the printer 1.

When the value of M is equal to the threshold 3 or greater (Step S1309: Yes), the controller 60 predicts that execution of the print job at the default system speed will cause a third temperature-rise delay process to be started before completion of the print job (Step S1310).

The controller 60 then acquires the developer-temperature-rise print time table from the print time table storage 607 and estimates the print times expected to be taken to finish the print job acquired in Step S1201 at the respective system speeds (namely, 185 mm/sec, 167 mm/sec, and 148 mm/sec) with reference to the developer-temperature-rise print time table (Step S11311). Then, the processing moves onto Step S1312.

If any of the judgments in Steps S1301, S1305, and S1309 results in the negative (Step S1301: No, Step S1305: No, or Step S1309: No), the controller 60 determines the default system speed as the initial system speed at which the print job is to be started (Step S1313).

As described above, the predication as to whether or not execution of a print job at the default system speed will cause a delay process is made based on the number of prints designated in the print job. In addition, when execution of a delay process is predicted, the optimum system speed is then selected as the initial system speed to minimize the print time, with reference to the print time table prepared in advance and showing the print times calculated for the respective system speeds, including the default one. This ensures the print job to be started at the optimum system speed determined in view the possible execution of delay process. Consequently, reduction in the print operation productivity is prevented by avoiding a print job from being started at an excessively high speed, which eventually causes execution of a delay process.

Modifications

Up to this point, the present invention has been described by way of the above embodiment. However, it should be naturally appreciated that the present invention is not limited to the specific embodiment and various modifications including the following may be made.

(1) In the system speed determining process according to the present embodiment, a prediction is made as to whether a delay process will be performed when a print job is started at the default system speed (see Steps S1303, S1307, and S1310 in FIG. 13), and then the print time taken to finish the acquired print job at each system speed is estimated. Alternatively, making the prediction of a delay process may be omitted, and the print time at each system speeds is estimated to determine one of the estimated system speeds corresponding to the shortest print time as the initial system speed at which the print job is to be started. The same alteration is applicable to Modifications (2) through (9) and (11) described below.

More specifically, it is possible to omit Steps S1301, S1303, S1305, S1307, S1309, S1310, and S1313 shown in FIG. 13 as well as Step S1504 shown in FIG. 15, which will be described later. Without these steps, the system speed is still optimally determined to minimize the print time regardless of whether or not a delay process is performed. Consequently, reduction in the print operation productivity is prevented by avoiding a print job from being started at an excessively high speed, which eventually causes execution of a delay process earlier than actually necessary.

(2) In the system speed determining process according to the present embodiment, the system speed corresponding to the shortest print time is selected from among the respective system speeds when a delay process is predicted due to an excessive rise in the recording sheet temperature, in the edge temperature, or in the developer temperature. In addition, the system speed determining process may also be performed in the following case.

That is, there may be a case where the acquired print job in the page description language (PDL) is composed of pages with a relatively high coverage rate (the rate of the number of colored dots to the total number of dots in each page). Such a print job requires a long time for a process to rasterize the image data to generate page-by-page image data (such a process is referred to as raster image processing (RIP)). When the process taken for the RIP processing is longer than the print time per page at the set system speed, the print operation needs to be placed in standby until image data to be printed is generated by the RIP processing. In the case where such a delay of the print operation is predicted, the system speed determining process may be performed to minimize the print time.

In particular, an RIP-processing print time table is prepared in advance by the manufacturer of the printer 1 and stored to the print time table storage 607. The RIP-processing print time table shows the relationship among R, S, and D for ranges of average coverage rates (AV) of the pages to be printed, where R denotes the time taken for the RIP processing (hereinafter, simply referred to as "RIP time"), S denotes the print time per page at each system speed, and D denotes the RIP delay time per page (D=R−S). FIG. 14 is a specific example of a RIP-processing print time table.

Figure 15:
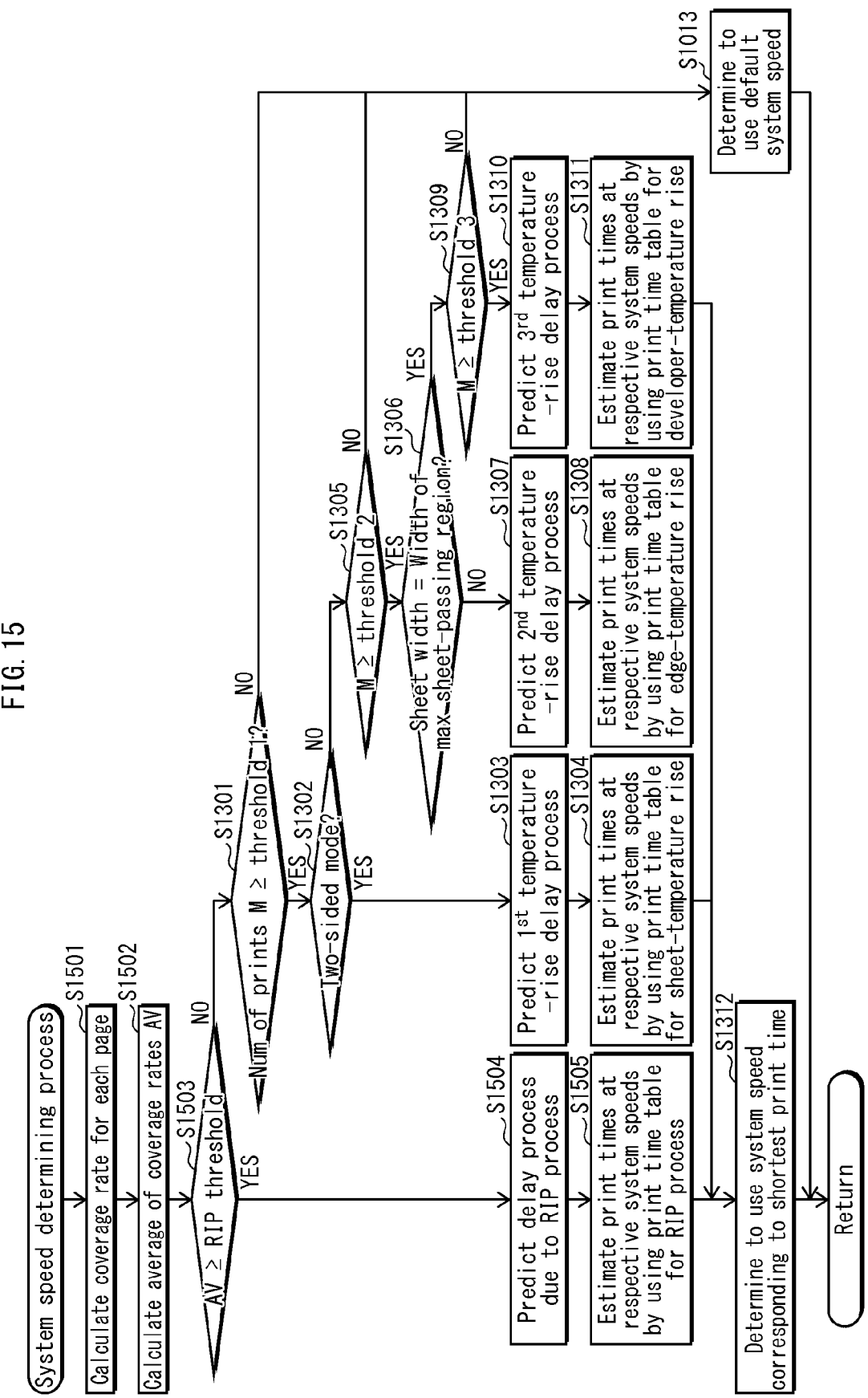
FIG. 15 is a flowchart of a modified system speed determining process performed by the controller 60.

The system speed determining process may be performed according to the flowchart shown in FIG. 15. In the figure, the same steps as those of the system speed determining process shown in FIG. 13 are denoted by the same step numbers. The following describes the differences.

On acquiring a print job in a PDL format, the controller 60 calculates the coverage rate for each page of image data in the print job (Step S1501) and calculates the average of the thus calculated coverage rates (Step S1502).

Next, the controller 60 judges whether or not the value of AV is equal to the RIP threshold or greater (Step S1503). The term "RIP threshold" refers to the minimum value of the coverage rate up to which the resulting RIP delay time is greater than 0, provided that the print time per page denoted by S is the print time at the default system speed. The RIP threshold is set (to 40% in this example) in advance by the manufacture of the printer 1.

When the value of AV is equal to the RIP or greater (Step S1503: Yes), the controller 60 predicts that execution of the print job at the default system speed will cause a delay process due to the RIP processing (to be more precise, a process of delaying the start of print operation until completion of RIP processing of image data to be printed) to be started before completion of the print job (Step S1504). The controller 60 then acquires the RIP-processing print time table from the print time table storage 607 and estimates the print times expected to be taken to finish the print job acquired in Step S1201 at the respective system speeds (namely, 185 mm/sec, 167 mm/sec, and 148 mm/sec), with reference to the RIP-processing print time table (Step S1505). Then, the processing moves onto Step S1312.

In particular, the print times (X) are calculated in the following equation:

$$X = \text{Num}/S + D \times \text{Num},$$

where

Num denotes the number of prints designated in the print job, and

D denotes the RIP delay time which correspond to AV and the system speed.

With this modification, the prediction as to whether or not execution of a print job at the default system speed will cause a delay process due to the RIP processing is made based on the average coverage rate (AV) of image data in the respective pages to be printed in the print job. In addition, when execution of a delay process due to the RIP processing is predicted, the system speed corresponding to the shortest print time is selected as the initial system speed, with reference to the RIP-processing print time table that is prepared in advance and shows the print times calculated for the respective system speeds, including the default system speed. Consequently, reduction in the print operation productivity is prevented by avoiding a print job from being started at an excessively high speed, which eventually causes execution of a delay process due to the RIP processing.

(3) In the system speed determining process according to the present embodiment, regardless of whether the print job is to be executed in the single color mode or the multi-color mode, the same thresholds are used to predict whether or not a delay process will be performed and the same print time tables are used to calculate the print time. Yet, as will be described below, the print modes affects the rise in the edge temperature and the developer temperature as well as the likelihood of occurrence of tacking in the exit tray 72 when the print operation is continually performed. In view of the influence, it is applicable to use different thresholds and different print time tables depending on the printing mode.

The single-color mode involves a smaller amount of toner to be thermally fixed as compared to that in the multi-color mode. Therefore, a less amount of heat is lost from the heating belt 52 during the thermal fixing operation, and thus a less amount of heat is supplied to maintain the sheet-passing region at the predetermined fixing temperature. Accordingly, the temperature of the edge portions of the heating belt 52 is less easily elevated. Therefore, in the single-color mode, the number of prints that can be produced before the edge temperature reaches the permissible threshold 2 is greater than the threshold (threshold 2) determined for the multi-color mode. Accordingly, the possibility of occurrence of a delay process (second temperature-rise delay process) is reduced.

In the multi-color mode, a plurality of developers t disposed closed to one another operate, whereas only one developer operates in the single-color mode. That is, there is no influence of heat generated in a nearby developer, which suppresses the temperature rise in the developers. Therefore, in the single-color mode, the number of prints that can be produced before the edge temperature reaches the permissible threshold 3 is greater than the threshold (threshold 3) determined for the multi-color mode. Accordingly, the possibility of occurrence of a delay process (third temperature-rise delay process) is reduced.

The risk of tacking increases with the amount of toner deposited on the recording sheets. Thus, the risk of tacking is lower in the single-color mode than in the multi-color mode because the amount of toner deposited is generally smaller in the single-color mode. In other words, in the single-color mode, no tacking is expected to occur even when the number of prints exceeds the permissible threshold 1.

In view of the above, it is applicable to provide for the single-color mode, different thresholds (namely, thresholds 1, 2, and 3) and different print time tables (namely, sheet-temperature-rise print time table, edge-temperature-rise print time table, and developer-temperature-rise print time table) for use in predicting the occurrences of first, second, and third temperature-rise delay processes, and to store the thresholds in the threshold storage 608 and the print-time calculation tables in the print time table storage 607. Then, the system speed determining process is performed with the use of the thresholds and print time tables corresponding to the print mode designated in the print condition of a print job to be processed.

Figure 16:
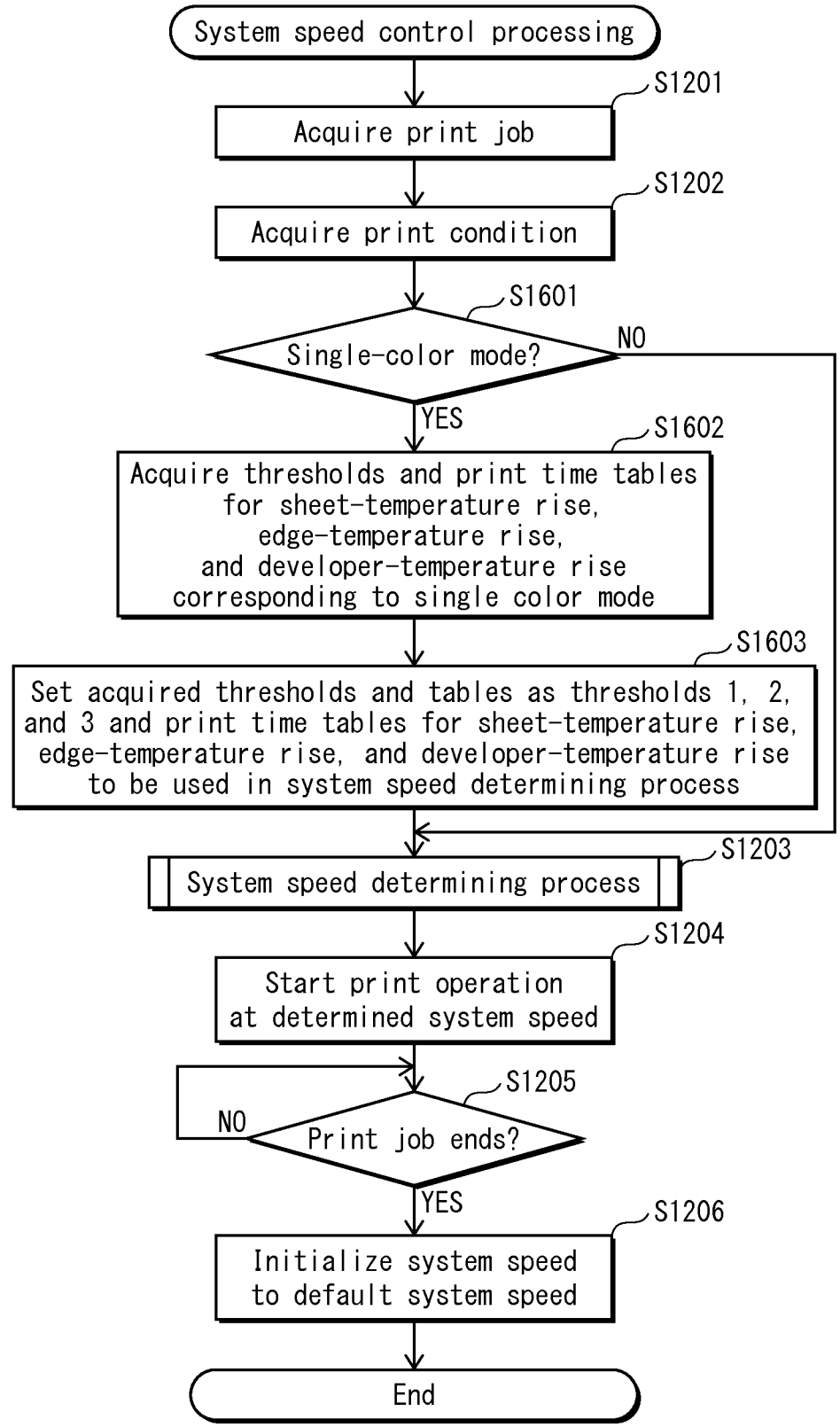
FIG. 16 is a flowchart of Modification 1 of the system speed control processing performed by the controller 60.

FIG. 16 is a flowchart of operations involved in the system speed control processing according to the above modification. In the figure, the same steps as those of the system speed control processing shown in FIG. 12 are denoted by the same step numbers. The following describes the differences. After acquiring the print condition from the print job in Step S1202, the controller 60 judges whether or not the print condition designates the single-color mode (Step S1601).

When the single-color mode is designated (Step S1601: Yes), the controller 60 acquires the thresholds (namely, thresholds 1, 2, and 3) for the single-color mode from the threshold storage 608 and acquires the print time tables (namely, sheet-temperature-rise print time table, edge-temperature-rise print time table, and developer-temperature-rise print time table) for the single-color mode from the print time table storage 607 (Step S1602). Then, the controller 60 sets the thus acquired threshold as the thresholds 1, 2, and 3 all to be used in the system speed determining process, and also sets the thus acquired print time tables as the sheet-temperature-rise print time table, edge-temperature-rise print time table, and developer-temperature-rise print time table all to be used in the system speed determining process (Step S1603). Finally, the controller 60 performs Step S1203 with the use of the thresholds and print time tables set in Step S1603.

With this modification, the difference in the printing modes are taken into consideration, so that the system speed is determined even more appropriately. For example, a specific number of prints designated in a print job may trigger execution of a delay process in the multi-color mode but not in the single-color mode. In such a case, the modification prevents an error in predicting that the print job in the single-color mode will cause execution of a delay process. Such an error results in determining a system speed lower than the default system speed as the initial system speed at which the print job is to be started. Consequently, reduction in the print operation productivity is prevented by avoiding a print job in the single-color mode from being started at a lower speed than actually necessary.

(4) In the system speed determining process according to the present embodiment, regardless of the amount of toner deposited per page in a print job, the same thresholds are used to predict whether or not a delay process will be performed and the same print time tables are used to calculate the print time. Yet, as will be described below, the amount of toner deposited per page affects the rise in the edge temperature and developer temperature as well as the likelihood of occurrence of tacking in the exit tray 72 when print operation is continually performed. In view of the influence, it is applicable to use different thresholds and different print time tables depending on the amount of toner deposited per page.

The amount of toner to be thermally fixed increases with the amount of toner deposited. Therefore, a greater amount of heat is lost from the heating belt 52 during the thermal fixing operation and thus a greater amount of heat is supplied to maintain the sheet-passing region at the predetermined fixing temperature. Accordingly, the temperature of the edge portions of the heating belt 52 is elevated more easily. Therefore, the number of prints that can be produced before the edge temperature reaches the permissible threshold 2 is smaller as the amount of toner deposited increases.

Yet, as the amount of toner deposited increases, a greater amount of toner in the developers is consumed. Accordingly, the temperature in the developers is elevated less easily. Therefore, the number of prints that can be produced before the developer temperature reaches the permissible threshold 3 is greater as the amount of toner deposited increases.

The risk of tacking increases with the amount of toner deposited on the recording sheets. Thus, the risk of tacking is higher as the amount of toner deposited per page in the print job increases, so that a smaller number of prints may incur the risk of tacking.

In view of the above, it is applicable to perform the system speed determining process by using the average of the sums of pixel values (gray levels) of pixels constituting the image data of the respective pages as an index of the amount of toner deposited per page in a print job in the following manner.

First of all, for each of a plurality of ranges of averages of the sums, a different set of thresholds (namely, thresholds 1, 2, and 3) and a different set of print time tables (namely, sheet-temperature-rise print time table, edge-temperature-rise print time table, and developer-temperature-rise print time table) are provided in advance for use in the respective predictions and print time calculations. Then, a threshold table showing the relationship between the sets of thresholds and the ranges of averages of the sums is stored in the threshold storage 608. In addition, a selection table showing the relationship between the sets of print time tables and the ranges of averages of the sums is stored in the print time table storage 607. Then, the system speed determining process is performed using the thresholds and print time tables corresponding to the average of the sums of the print job to be executed.

Figure 17:
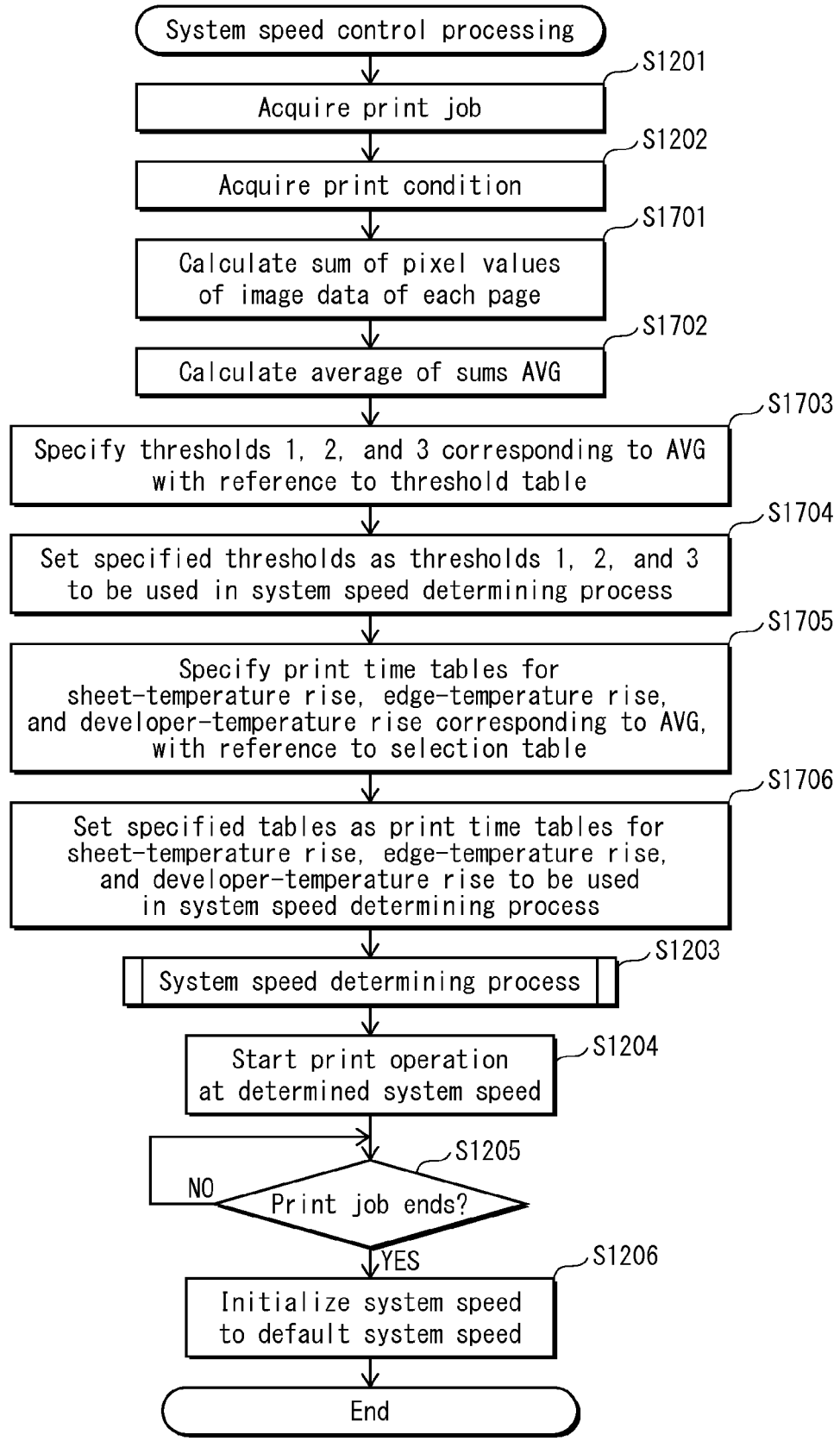
FIG. 17 is a flowchart of Modification 2 of the system speed control processing performed by the controller 60.

FIG. 17 is a flowchart of operations involved in the system speed control processing according to the above modification. In the figure, the same steps as those of the system speed control processing shown in FIG. 12 are denoted by the same step numbers. The following describes the differences.

After acquiring the print condition from the print job in Step S1202, the controller 60 calculates the sum of the pixel values (gray levels) of the pixels constituting the image data of each page (Step S1701) and then calculates the average value of the sums (AVG) (Step S1702).

The controller 60 then acquires the threshold table from the threshold storage 608 and specifies the thresholds 1, 2, and 3 each corresponding to AVG with reference to the threshold table (Step S1703) and sets the specified threshold as the thresholds be used in the system speed determining process (Step S1704).

The controller 60 further acquires the selection table from the print time table storage 607 and specifies the sheet-temperature-rise print time table, edge-temperature-rise print time table, and developer-temperature-rise print time table each corresponding to AVG with reference to the selection table (Step S1705) and sets the respective tables thus selected as the sheet-temperature-rise print time table, edge-temperature-rise print time table, and developer-temperature-rise print time table to be used in the system speed determining process (Step S1706). Then, Step S1203 is performed with the use of the thresholds and tables set in Steps S1704 and S1706.

With this modification, the difference in the amount of toner deposited to the pages among print jobs is taken into consideration, so that the system speed is determined even more appropriately. Consequently, reduction in the print operation productivity is prevented by avoiding a print job from being started at a system speed not appropriate due to the influence of the amount of toner deposited.

(5) In the system speed determining process according to the present embodiment, regardless of the printer temperature at the start of a print job, the same thresholds are used to predict whether or not a delay process will be performed and the same print time tables are used to calculate the print time. Yet, as will be described below, the initial printer temperature affects the rise in the edge temperature and the developer temperature as well as the likelihood of occurrence of tacking in the exit tray 72 when print operation is continually performed. In view of the influence, it is applicable to use different thresholds and different print time tables depending on the printer temperature measured at the start of a print job.

With an increase in the printer temperature, the temperature of recording sheets transported in the printer 1 increases. Therefore, a less amount of heat is lost from the heating belt 52 when recording sheets are transported along the sheet-passing region during the thermal fixing operation. Thus, a less amount of heat is supplied to maintain the sheet-passing region at the predetermined fixing temperature. Accordingly, the temperature of the edge portions of the heating belt 52 is not easily elevated. Therefore, the number of prints that can be produced before the edge temperature reaches the permissible threshold 2 increases as the printer temperature increases.

As the printer temperature increases, the temperature in the developers tends to increase. Consequently, as the printer temperature increases, the number of prints that can be produced before the temperature in the developers reaches the permissible threshold 3 decreases.

Once the printer temperature is elevated, the recording sheets after the thermal fixing are not sufficiently cooled while being transported within the printer 1. Accordingly, the temperature of the recording sheets ejected into the exit tray 72 tends to be elevated. As a result, a smaller number of prints may incur the risk of tacking as the printer temperature increases.

It is therefore applicable to provide in advance a different set of thresholds (namely, thresholds 1, 2, and 3) and a different set of print time tables (namely, sheet-temperature-rise print time table, edge-temperature-rise print time table, and developer-temperature-rise print time table) for each of a plurality of ranges of printer temperatures for use in predictions and print time calculations. Then, a threshold table showing the relationship between the sets of thresholds and the ranges of printer temperatures is stored in the threshold storage 608. In addition, a selection table showing the relationship between the sets of print time tables and the ranges of printer temperature is stored in the print time table storage 607. Then, the system speed determining process is performed using the thresholds and print time tables corresponding to the initial printer temperature at the start of the print job.

Figure 18:
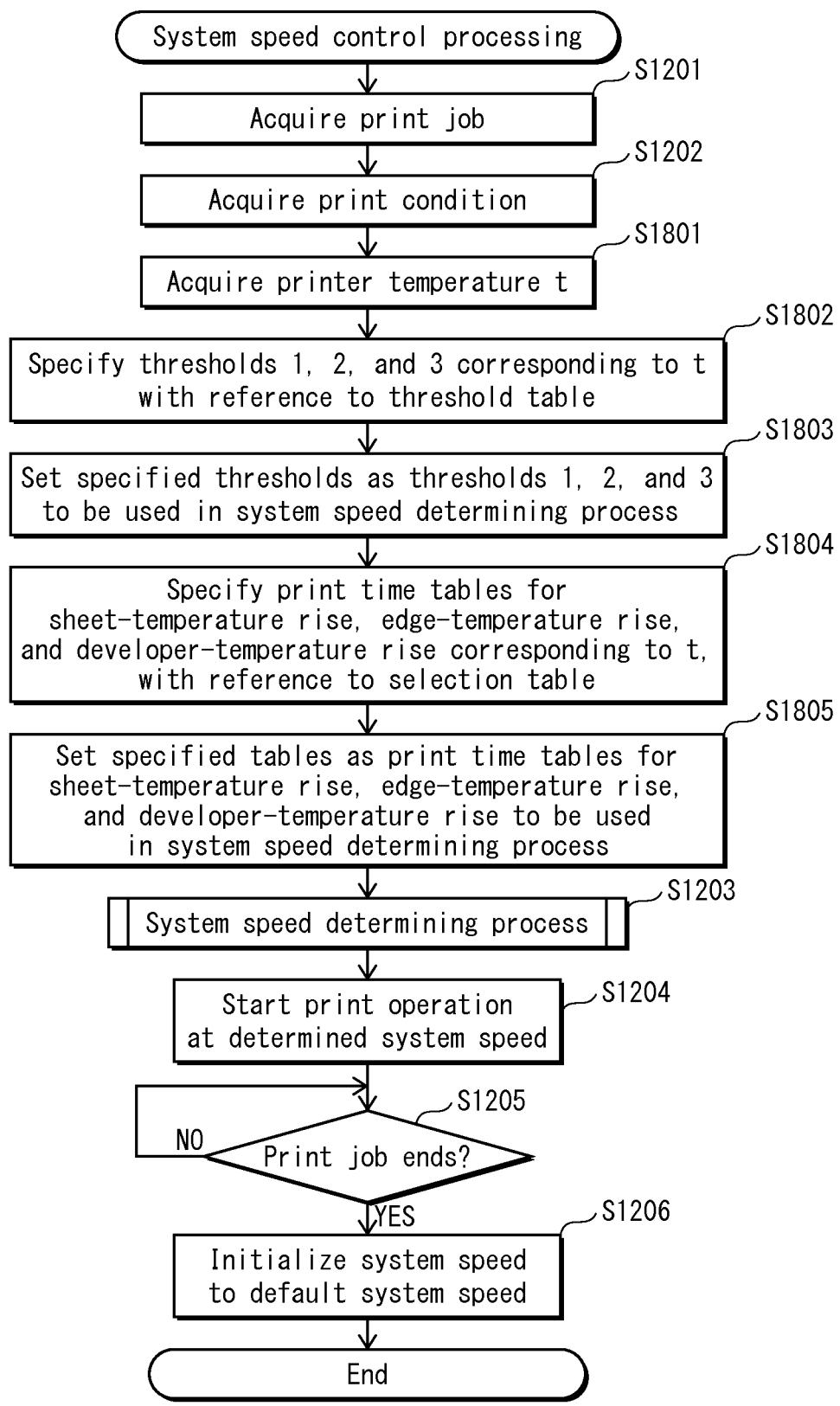
FIG. 18 is a flowchart of Modification 3 of the system speed control processing performed by the controller 60.

FIG. 18 is a flowchart of operations involved in the system speed control processing according to the above modification. In the figure, the same steps as those of the system speed control processing shown in FIG. 12 are denoted by the same step numbers. The following describes the differences.

After acquiring the print condition from the print job in Step S1202, the controller 60 also acquires the printer temperature (t) measured by the temperature sensor 81 (Step S1801). The controller 60 then acquires the threshold table from the threshold storage 608 and specifies the thresholds 1, 2, and 3 corresponding to the printer temperature (t) with reference to the threshold table (Step S1802). The controller 60 then sets the thresholds 1, 2, and 3 as the thresholds to be used in the system speed determining process (Step S1803).

The controller 60 further acquires the selection table from the print time table storage 607 and specifies the sheet-temperature-rise print time table, edge-temperature-rise print time table, and developer-temperature-rise print time table each corresponding to the printer temperature (t) (Step S1804) and sets the respective tables thus selected as the sheet-temperature-rise print time table, edge-temperature-rise print time table, and developer-temperature-rise print time table to be used in the system speed determining process (Step S1805). Then, Step S1203 is performed with the use of the thresholds and tables set in Steps S1803 and S1805.

With this modification, the printer temperature at the start of a print job is taken into consideration, so that the system speed is determined even more appropriately. Consequently, reduction in the print operation productivity is prevented by avoiding a print job from being started at a system speed not appropriate due to the influence of the initial printer temperature.

(6) In the system speed determining process according to the present embodiment, regardless of the basis weight of recording sheets used in a print job, the same set of thresholds is used to predict whether or not a delay process will be performed and the same set of print time tables is used to calculate the print time. Yet, as will be described below, the basis weight of recording sheets affects the rise in the edge temperature as well as the likelihood of occurrence of tacking in the exit tray 72 when print operation is continually performed. In view of the influence, it is applicable to use a different set of thresholds and a different set of print time tables depending on the basis weight of recording sheets.

With an increase in the basis weight of recording sheets, a greater amount of heat is lost from the heating belt 52 through contact between each recording sheet and the sheet-passing region during the thermal fixing operation. Thus, a greater amount of heat is supplied to maintain the sheet-passing region at the predetermined fixing temperature. Accordingly, the temperature of the edge portions of the heating belt 52 tends to be elevated more easily. Therefore, the number of prints that can be produced before the edge temperature reaches the permissible threshold 2 is smaller as the basis weight of recording sheets increases.

In addition, an increase in the basis weight of recording sheets means that the pressure applied to the recording sheets under their own weight increases. Therefore, the toner on each recording sheet stacked in the exit tray 72 after the thermal fixing is pressed against the recording sheet located immediately below at a greater pressure, which involves a greater risk of tacking. As a result, a smaller number of prints may incur the risk of tacking as the basis weight of recording sheets increases.

It is therefore applicable to provide in advance a different set of thresholds (namely, thresholds 1 and 2) and a different set of print time tables (namely, sheet-temperature-rise print time table and edge-temperature-rise print time table) for each of a plurality of ranges of the basis weight of recording sheets for use in predictions and print time calculations. Then, a threshold table showing the relationship between the sets of thresholds and the ranges of ranges of the basis weight of recording sheets is stored in the threshold storage 608. In addition, a selection table showing the relationship between the sets of print time tables and the ranges of the basis weight of recording sheets is stored in the print time table storage 607. Then, the system speed determining process is performed using the thresholds and print time tables corresponding to the basis weight of recording sheets.

Figure 19:
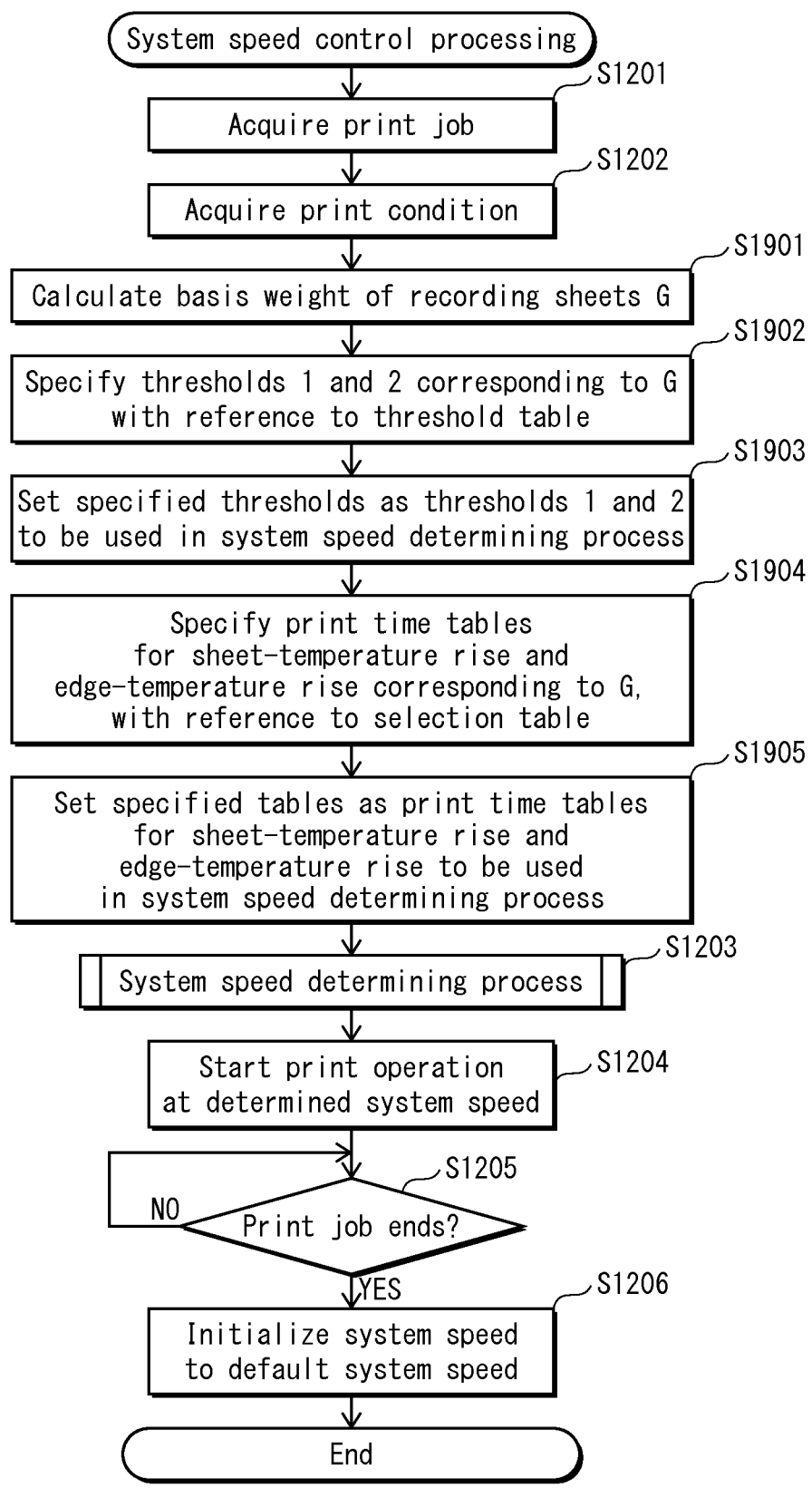
FIG. 19 is a flowchart of Modification 4 of the system speed control processing performed by the controller 60.

FIG. 19 is a flowchart of operations involved in the system speed control processing according to the above modification. In the figure, the same steps as those of the system speed control processing shown in FIG. 12 are denoted by the same step numbers. The following describes the differences.

After acquiring the print condition from the print job in Step S1202, the controller 60 calculates the basic weigh (G) of recording sheets based on the recording sheet type (plain paper, thick paper, and thin paper each differing in basis weight) designated in the print condition (Step S1901). In this modification, the ROM 602 stores a basis-weight table showing the relationship between the recording sheet types and corresponding basis weights, and the controller 60 calculates the basis weight with reference to the basis-weight table.

Then, the controller 60 acquires the threshold table from the threshold storage 608 and specifies the thresholds 1 and 2 corresponding to the basis weight (G) with reference to the threshold table (Step S1902) and sets the thresholds as the thresholds 1 and 2 to be used in the system speed determining process (Step S1903).

The controller 60 further acquires the selection table from the print time table storage 607 and specifies the sheet-temperature-rise print time table, and edge-temperature-rise print time table each corresponding to the basis weight (G) (Step S1904) and sets the respective tables thus selected as the sheet-temperature-rise print time table, and edge-temperature-rise print time table to be used in the system speed determining process (Step S1905). Then, Step S1203 is performed with the use of the thresholds and tables set in Steps S1903 and S1905.

With this modification, the basis weight of recording sheets used in a print job is taken into consideration, so that the system speed is determined even more appropriately. Consequently, reduction in the print operation productivity is prevented by avoiding a print job to be started at a system speed not appropriate due to the influence of the basis weight of recording sheet.

(7) In the system speed determining process according to the present embodiment, regardless of the width of recording sheets (the width in the direction of the rotation axis) used in a print job, the same threshold is used to predict whether or not a delay process (second temperature-rise process) will be performed and the same print time table is used to calculate the print time. Yet, as will be described below, the recording sheet width affects the change in the edge temperature when print operation is continually performed. In view of the influence, it is applicable to use different thresholds and different print time tables depending on the recording sheet width.

With an increase in the recording sheet width, the width of non-sheet-passing regions of the heating belt 52 correspondingly decreases. As a result, the extent of temperature rise occurring in the non-sheet-passing regions is reduced. Therefore, the number of prints that can be produced before the edge temperature reaches the permissible threshold 2 increases with the recording sheet width.

It is therefore applicable to provide in advance a different threshold (namely, threshold 2) and a different print time table (namely, edge-temperature-rise print time table) for each of a plurality of ranges of the recording sheet widths for use in predictions and print time calculations. Then, a threshold table showing the relationship between the thresholds and the recording sheet widths is stored in the threshold storage 608. In addition, a selection table showing the relationship between the print time tables and the ranges of recording sheet widths is stored in the print time table storage 607. Then, the system speed determining process is performed using the threshold and print time tables corresponding to the recording sheet width used in the print job.

Figure 20:
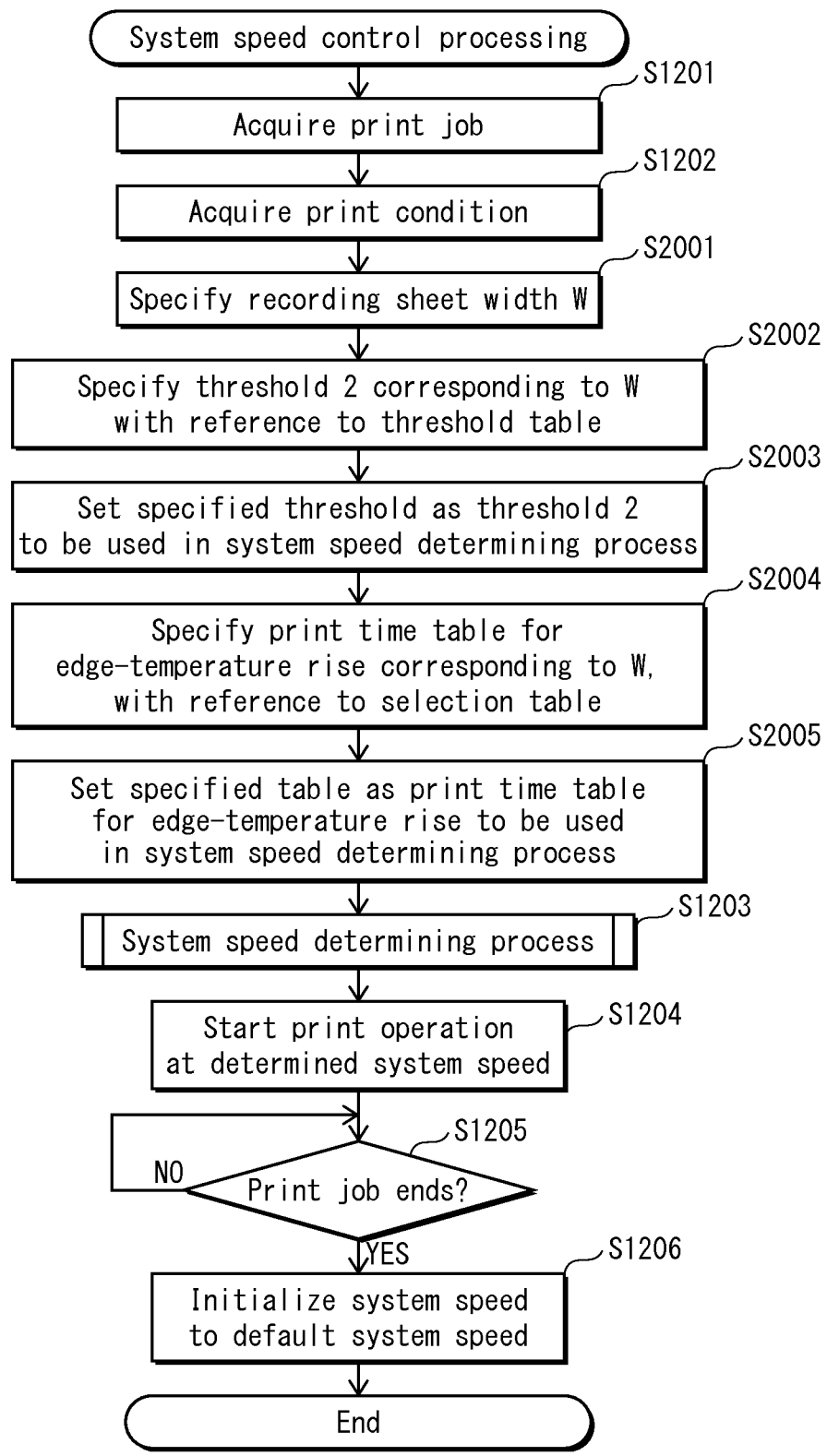
FIG. 20 is a flowchart of Modification 5 of the system speed control processing performed by the controller 60.

FIG. 20 is a flowchart of operations involved in the system speed control processing according to the above modification. In the figure, the same steps as those of the system speed control processing shown in FIG. 12 are denoted by the same step numbers. The following describes the differences.

After acquiring the print condition from the print job in Step S1202, the controller 60 specifies the recording sheet width (W), with reference to the sizes designated in the print condition according to the Japanese Industrial Standards (JIS), such as A4 size, A3 (landscape) size, A3 (portrait) size, B4 size, B5 size (Step S2001).

In this modification, the ROM 602 stores a recording-width table showing the relationship between the recording sheet sizes and corresponding recording sheet widths, and the controller 60 specifies the recording sheet width (W) with reference to the recording-width table.

The controller 60 then acquires the threshold table from the threshold storage 608 and specifies the threshold 2 corresponding to the recording sheet width (W) with reference to the threshold table (Step S2002) and sets the specified threshold as the threshold 2 to be used in the system speed determining process (Step S2003).

The controller 60 further acquires the selection table from the print time table storage 607 and specifies the edge-temperature-rise print time table corresponding to the recording sheet width (W) (Step S2004) and sets the table thus selected as the edge-temperature-rise print time table to be used in the system speed determining process (Step S2005). Then, Step S1203 is performed with the use of the threshold and table set in Steps S2003 and S2005.

With this modification, the recording sheet width used in a print job is taken into consideration, so that the system speed is determined even more appropriately. Consequently, reduction in the print operation productivity is prevented by avoiding a print job to be started at a system speed not appropriate due to the influence of the recording sheet width.

(8) In the system speed control processing according to the present embodiment, once the system speed is determined at the start of a print job, the same system speed is used throughout the print job unless a delay process is started. Alternatively, a modification may be made to adjust the system speed in the case where another print job of the same print condition as the current print job is acquired during the execution of the current print job.

Figure 21:
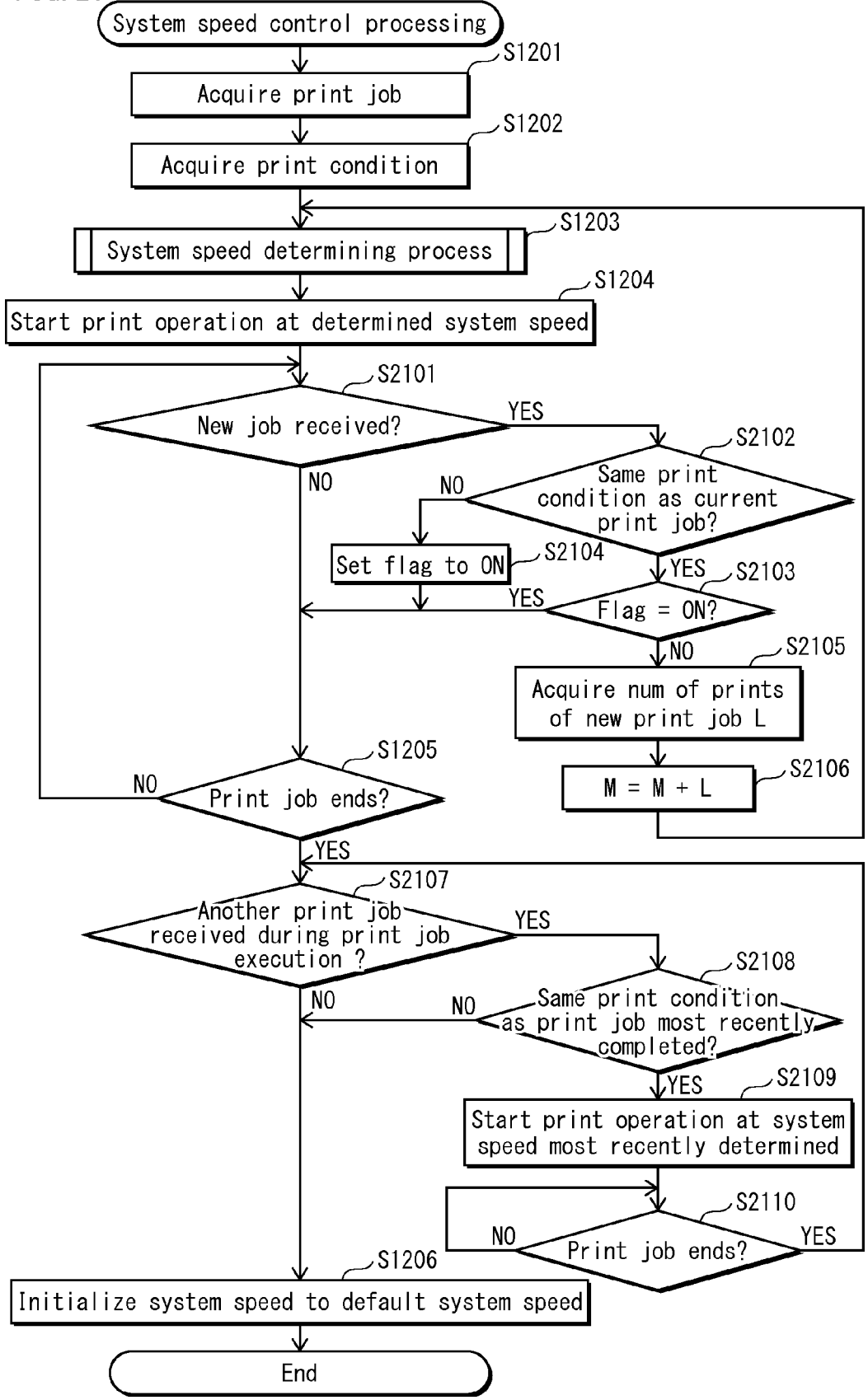
FIG. 21 is a flowchart of Modification 6 of the system speed control processing performed by the controller 60.

FIG. 21 is a flowchart of operations involved in the system speed control processing according to the above modification. In the figure, the same steps as those of the system speed control processing shown in FIG. 12 are denoted by the same step numbers. The following describes the differences.

The controller 60 starts a print job at the system speed determined in Step S1204. Then, when a new print job is received during execution of the current print job and before the start of a delay process (Step S2101: Yes), the controller 60 acquires the print condition of the new print job and judges whether the print condition of the new print job is the same as the print condition of the current print job (Step S2102).

If the respective print conditions are the same (Step S2102: Yes), the controller 60 judges whether a flag is set to ON to indicate that another print job with the print condition different from that of the current print job has already been received during the execution of the current print job (Step S2103). The flag is initialized to OFF at the start of a print job.

When the flag is OFF (Step S2103: No), the controller 60 acquires the number of prints (L) designated in the new print job received in Step S2101, and calculates the sum of the number of prints (M) designated in the current print job and the number of prints (L) acquired for the new print job, and sets the thus calculated sum (M+L) as the number of prints used to calculate the print time in the system speed determining process in Step S1203 (Step S2106). In particular, M=M+L is calculated and then Step S1203 is performed.

With this modification, the system speed is adjusted to the system speed corresponding to the shortest print time taken for the print operation to produce the total number of prints. Thereafter, the print operation is continued at the adjusted system speed to complete the unfinished part of the current print job, until a delay process (interval-control delay process or suspend-control delay process) is performed.

On completion of the current print job being executed (Step S1205: Yes), the controller 60 judges whether or not any print job is received in Step S2101 during the execution of the print job received in Step S1201 (Step S2107: Yes). If a plurality of print jobs are received in Step S2101, the controller 60 then judges whether the print job to be executed next designates the same print condition with the print condition of the print job most recently completed (Step S2108).

When the judgment in Step S2108 results in the affirmative (Step S2108: Yes), the controller 60 starts the next print job at the system speed that is most recently determined and maintains the system speed until a delay process (interval-control delay process or suspend-control delay process) is performed (Step S2109). Upon completion of the print job (Step S2110: Yes), the processing moves onto Step S2107.

When the judgment in Step S2102 results in the negative (Step S2102: No), the controller 60 sets the flag to ON (Step S2104) and moves onto Step S1205.

On the other hand, when the judgment in Step 2101 results in the negative (Step S2101: No) and the judgment in Step S2103 results in the affirmative (Step S2103: Yes), the controller 60 moves onto Step S1205.

Further, when the judgment in Step S2107 results in the negative (Step S2107: No) and the judgment in Step S2108 results in the negative (Step S2108: No), the controller 60 moves onto Step S1206.

With this modification, when a new print job with the same print condition as that of the current print job is received during execution of the current print job, the system speed determining process is performed again based on the total number of prints designated in the two print jobs. Therefore, in the case where a plurality of print jobs are executed in succession and thus the number of prints to be produced in succession is increased after the system speed is initially determined, the system speed is adjusted to the speed corresponding to the shortest print time to produce the number of prints reflecting the increase. In this way, reduction in the print operation productivity is prevented by avoiding the print operation from being continued at the system speed initially determined based on the number of prints not reflecting the increase.

(9) The system speed control processing according to the present embodiment may be modified to determine the system speed to resume the print operation in the case where the print operation executed at the initially determined system speed is interrupted due to various interruption events, such as a sheet jam, an out-of-toner error, an out-of-sheet error, and so on. The system speed after the interruption may be determined according to the duration of interruption.

Figure 22:
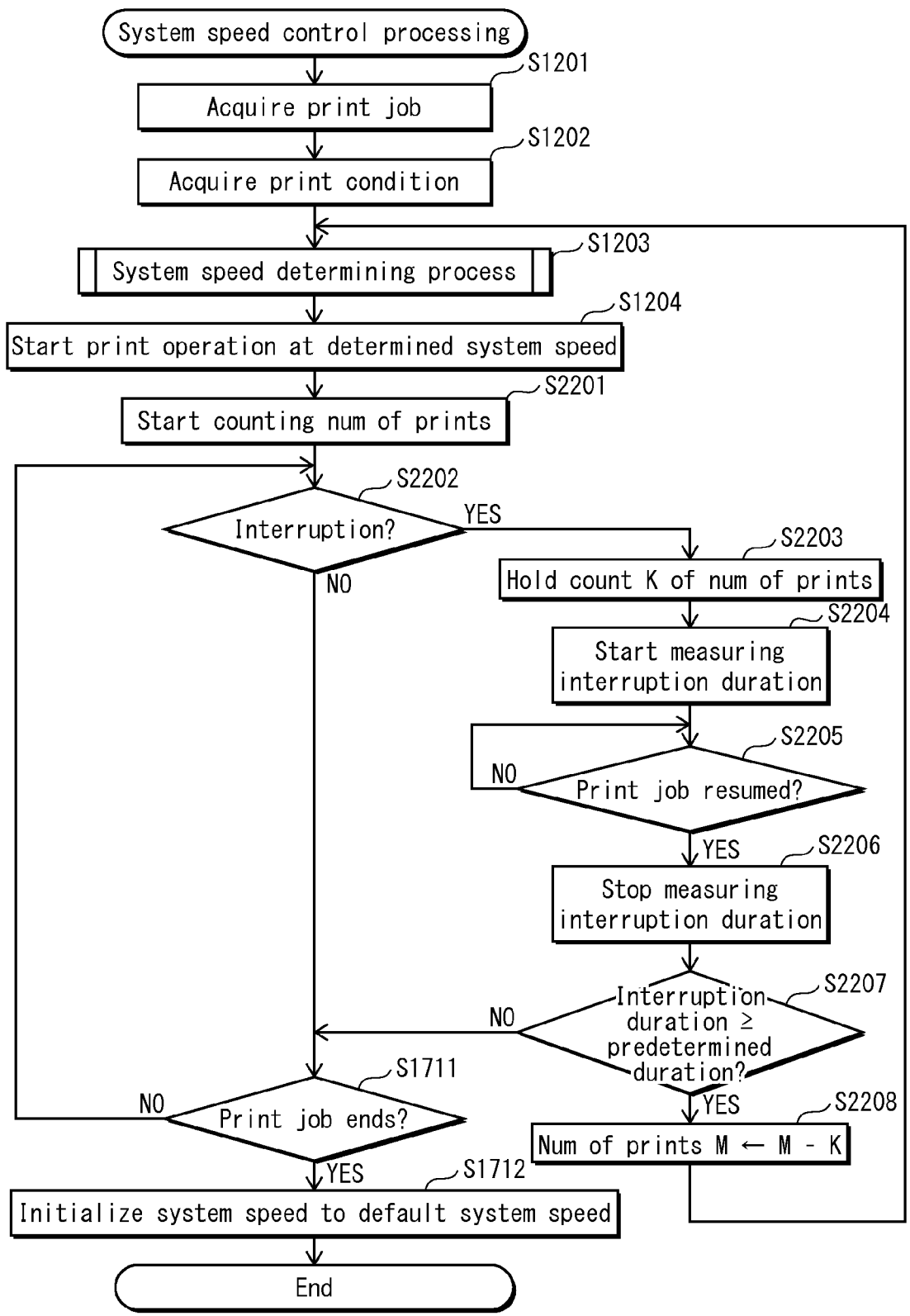
FIG. 22 is a flowchart of Modification 7 of the system speed control processing performed by the controller 60.

FIG. 22 is a flowchart of operations involved in the system speed control processing according to the above modification. In the figure, the same steps as those of the system speed control processing shown in FIG. 12 are denoted by the same step numbers. The following describes the differences.

Once the print operation for a print job is started at the system speed determined in Step S1204, the controller 60 starts counting the number of prints having been produced (Step S2201) to monitor occurrence of an interruption event. On the occurrence of an interruption event (Step S2202: Yes), the controller 60 interrupts the print job and keeps the count value (K) of the number of prints having been produced by the time of interruption (Step S2203), starts measuring the interruption duration (Step S2204) and monitors whether or not the print job is resumed (Step S2205).

In this modification, the occurrence of an interruption event is monitored with the use of a sensor, such as an optical sensor. In addition, whether or not the interrupted print job is resumed is monitored by detecting whether or not an input requesting to start the print job is received on the operation panel 7 after the interruption.

When the interrupted print job is resumed (Step S2205: Yes), the controller 60 stops measuring the duration of interruption to acquire the interruption duration (Step S2206) and judges whether or not the interruption duration is equal to a predetermined duration (five minutes, for example) or longer (Step S2207).

Note that the interruption duration may be estimated, instead of measuring the interruption duration. For example, the number of prints having been produced by the time of interruption is used as an index indicating the interruption duration. With reference to this index, the controller 60 assumes the interruption was caused due to which one of an out-of-sheet error, an out-of-toner error, and a paper jam. On assuming that the cause is an out-of-sheet error or a sheet jam, the controller 60 assumes the interruption duration is relatively short (shorter than the predetermined duration). On assuming that the cause is an out-of-toner error, the controller 60 assumes the interruption duration is relatively long (equal to or longer than the predetermined duration).

In particular, the controller 60 judges whether the number of prints having been produced (K) by the time of interruption exceeds the maximum number of recording sheets that can contained in the paper feed cassette 41 (K1), and also judges whether or not the value of K exceeds the number of prints (K2) that can be produced with the remaining amount of toner detected at the start of the print job. to this end, the average amount of toner consumed per page is set in advance by the manufacturer of the printer 1, and then the number of prints (K2) is calculated by using the average amount of toner consumed per page. When the value of K exceeds the value of K1, the cause of interruption is assumed to be an out-of-sheet error. When the value of K exceeds the value of K2, the cause of interruption is assumed to be an out-of-toner error. When neither is true, the cause of interruption is assumed to be a sheet jam.

When the interruption duration is equal to the predetermined duration or longer (Step S2207: Yes), the controller 60 subtracts the count value (K) from the number of prints (M) designated in the print job interrupted, and sets the remaining number of prints (=M−K) as the number of prints to be used in the subsequent system speed determining process performed in Step S1203 (M=(M−K) (Step S2208). Then, Step S1203 is performed to newly determine the system speed at which the print job is resumed.

With this modification, when a print job is interrupted, the system speed at which the print job is to be resumed is optimally determined according to the interruption duration, and the print job is resumed at the newly determined system speed. This prevents reduction in the print operation productivity by avoiding the print job to be resumed at a system speed not appropriate due to the influence of the interruption.

In other words, when the interruption duration is relatively long, the edge temperature, developer temperature, and recording sheet temperature are expected to be reduced considerably and to the level closer to their initial temperatures at the start of the print job. In such a case, the system speed determining process is performed again to newly determine, as the system speed, the speed corresponding to the shortest print time taken to produce the remaining number of prints. The print job is resumed at the system speed newly determined.

On the other hand, when the interruption duration is relatively short, the edge temperature, developer temperature, and recording sheet temperature are expected not to be reduced much. In such a case, the print job is resumed at the initial system speed, which was determined based on the number of prints originally designated in the print job.

In this way, when a print job is interrupted, the system speed at which the print job is to be resumed is optimally determined according to the interruption duration. This prevents reduction in the print operation productivity.

(10) In the system speed determining process according to the present embodiment, the prediction as to whether or not a delay process is performed during execution of a print job is made based on the number of prints designated in the print job. However, there may be a case where the environment in which the printer 1 is installed undergoes significant change (for example, in the case where the printer 1 is installed in a room without air conditioning, the temperature of the room may be elevated extremely high due to hot weather). Also, there may be a case where the print operation is continually performed to produce an extremely large number of prints. When a print job is started under certain conditions as mentioned above, a delay process may be started after completion of a significantly smaller number of the number of prints than the thresholds (thresholds 2 and 3) that are used as the criteria to predict the second and third temperature-rise delay process.

Once a delay process is started, the print speed is reduced to an extremely lower speed than that before the delay process (in this example, to ½ the processing speed before the delay process). Therefore, the print operation productivity is reduced correspondingly to the extent the that the delay process is started earlier than actually necessary.

In order to reduce the loss of print operation productivity in such a case, a modification may be made to withhold execution of the delay process. The delay process is started after execution of the print job at the system speed reduced to a speed that is still higher than the system speed at which the delay process is started until the number of prints having been produced reaches the thresholds used to predict occurrence of the delay process.

Figure 23:
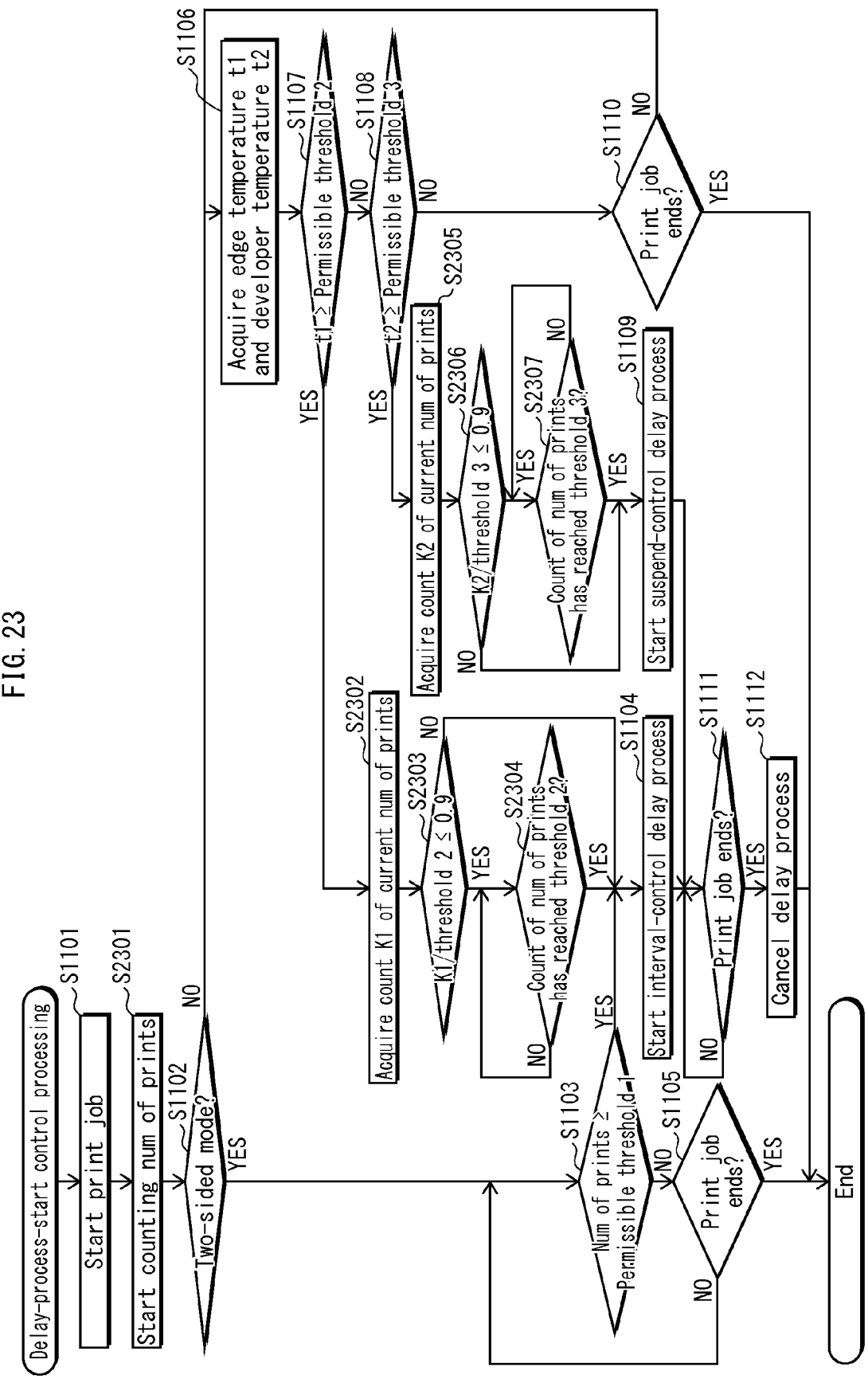
FIG. 23 is a flowchart of Modification 1 of the delay-process-start control processing performed by the controller 60.

FIG. 23 is a flowchart showing the operations involved in a modified delay-process-start control processing performed by the controller 60. In the figure, the same steps as those of the delay-process-start control processing shown in FIG. 11 are denoted by the same step numbers. The following describes the differences. After stating execution of the print job in Step S1101, the controller 60 starts counting the number of prints having been produced (Step S2301).

Then, when the value of t1 reaches the permissible threshold 2 in Step S1107 (Step S1107: Yes), the controller 60 acquires the current count (K1) of the number of prints having been produced in the print job (Step S2302), and calculates the ratio of K1 to the threshold 2 (K1/threshold 2) to judge whether the ratio is equal to 0.9 or smaller (Step S2303).

When the ratio is equal to 0.9 or smaller (Step S2303: Yes), the controller 60 withholds execution of the interval-control delay process until the count of the number of prints having been produced reaches the threshold 2 (Step S2304: Yes). The controller 60 moves onto Step S1104 only after the count reaches the threshold 2 (Step S2304: Yes). On the other hand, when the judgment in Step S2303 results in the negative (Step S2303: No), the controller 60 moves onto Step S1104.

Similarly, when the value of t2 reaches the permissible threshold 3 in Step S1108 (Step S1108: Yes), the controller 60 acquires the current count (K2) of the number of prints having been produced in the print job (Step S2305) and calculates the ratio of K2 to the threshold 3 (K2/threshold 3) to judge whether the ratio is equal to 0.9 or smaller (Step S2306).

When the ratio is equal to 0.9 or smaller (Step S2306: Yes), the controller 60 withholds execution of the suspend-control delay process until the count of the number of prints having been produced reaches the threshold 3 (Step S2307: Yes). The controller 60 moves onto Step S1109 only after the count reaches the threshold 3 (Step S2307: Yes). On the other hand, when the judgment in Step S2306 results in the negative (Step S2306: No), the controller 60 moves onto Step S1109.

Figure 24:
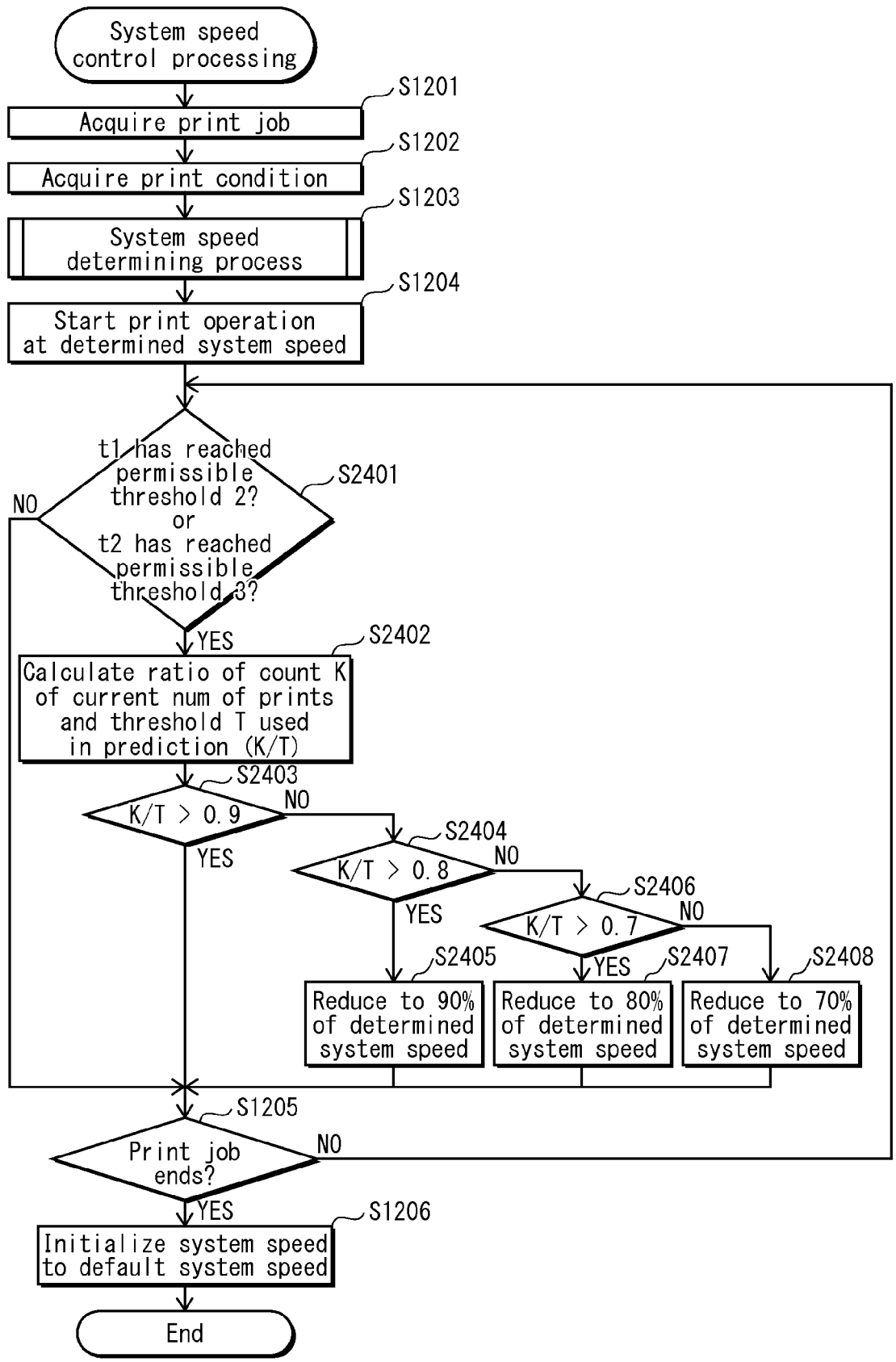
FIG. 24 is a flowchart of Modification 8 of the system speed control processing performed by the controller 60.

FIG. 24 is a flowchart showing the operations involved in a modified system speed control processing performed by the controller 60. In the figure, the same steps as those of the system speed control processing shown in FIG. 12 are denoted by the same step numbers. The following describes the differences.

After Step S1204, the controller 60 performs Steps S1107 and S1108 of the delay-process start control processing shown in FIG. 23. On judging that the value of t1 reaches the permissible threshold 2 in Step S1107 or that the value of t2 reaches the permissible threshold 3 in Step S1108 (Step S2401: Yes), the controller 60 calculates the ratio of K to T, where K denotes the current count, which is acquired in Steps S2302 or S2305, of the number of prints having been produced, and T denotes a threshold to be used in the prediction (Step S2402). More specifically, when the value of t1 reaches the permissible threshold 2, the count K1 is acquired and thus the ratio K1/threshold 2 is calculated in this step. On the other hand, when the value of t2 reaches the permissible threshold 3, the count K2 is acquired and thus the ratio K2/threshold 3 is calculated in this step.

When the ratio K/T thus calculated is 0.9 or lower (Step S2403: No) and execution of the delay process (interval-control delay process in the case where the value of t1 reached the permissible threshold 2, and suspend-control delay process in the case where the value of t2 reached the permissible threshold 3) has been withheld, the controller 60 reduces the system speed according to the ratio as follows.

That is, when 0.8<the ratio≤0.9 is true (Step S2403: No and Step S2404: Yes), the controller 60 reduces the system speed to 90% of the system speed determined in the system speed determining process (Step S2405).

When 0.7<the ratio≤0.8 is true (Step S2403: No, Step S2404: No, and S2406: Yes), the controller 60 reduces the system speed to 80% of the system speed determined in the system speed determining process (Step S2407).

When the ratio is 0.7 or lower (Step S2403: No, Step S2404: No, and S2406: No), the controller 60 reduces the system speed to 70% of the system speed determined in the system speed determining process (Step S2408).

Note that when the interval-control delay process is started, the print operation is performed at the reduced system speed. Similarly, when the suspend-control delay process is started, the print operation during the non-suspended periods is also performed at the reduced system speed.

As described above, a situation for causing a delay process (second or third temperature-rise delay process), i.e., a situation in which the edge temperature or the developer temperature is raised excessively, may occur before completion of the number of prints predicted to cause the delay process. In such a situation, execution of the delay process is withheld and the system speed is reduced (to a print speed higher than that to be used during the delay process or than the average print speed during the suspend-control delay process). Consequently, reduction in the print operation productivity is prevented by avoiding the delay process to be started earlier than actually necessary. In addition, reducing the system speed is effective to slows down the speed of the temperature rise.

(11) According to the present embodiment, the delay-start control processing uses the temperatures as the criteria to judge whether or not to start the second and third temperature-rise delay processes, whereas the system speed determining process uses the numbers of prints as the criteria to judge whether or not to start the second and third temperature-rise delay process. The relationship between the temperature and the number of prints may change depending the various factors, such as the distribution of heat from the heater 533 disposed in the heating roller 53 and the amount of toner remaining in the developers.

Change in the relationship will change the number of prints that can be produced before causing the second or third temperature-rise delay process. As a result, the relationships between the number of prints and print time shown in each print-time calculation table (namely, edge-temperature-rise print-time calculation table and developer-temperature-rise print-time calculation table) may change as well.

In view of the above, in each of the second and third temperature-rise delay processes, a different print-time calculation table may be used depending on the number of prints having been produced by the start of the delay process. To this end, selection tables as shown in FIGS. 25A and 25B are prepared and stored to the print-time-calculation-table storage 607 in advance. Each selection table shows a relationship between the numbers of prints and the print-time calculation tables to be used. Then, the print-time calculation tables and thresholds to be used in the system speed determining process can be appropriately selected as described below.

In one example, first is to acquire the number of prints having been produced by the time the second or third temperature-rise delay process is started during execution of a print job. Next is to select the print-time calculation table corresponding to the thus acquired number of prints with reference to the selection table. The thus selected print-time calculation table is to be used in the system speed determining process for the next print job. Finally, the thus acquired number of prints is set as the threshold to be used in the system speed determining process for the next print job to predict whether or not the corresponding delay process will be performed. More specifically, the following steps may be performed.

Figure 26:
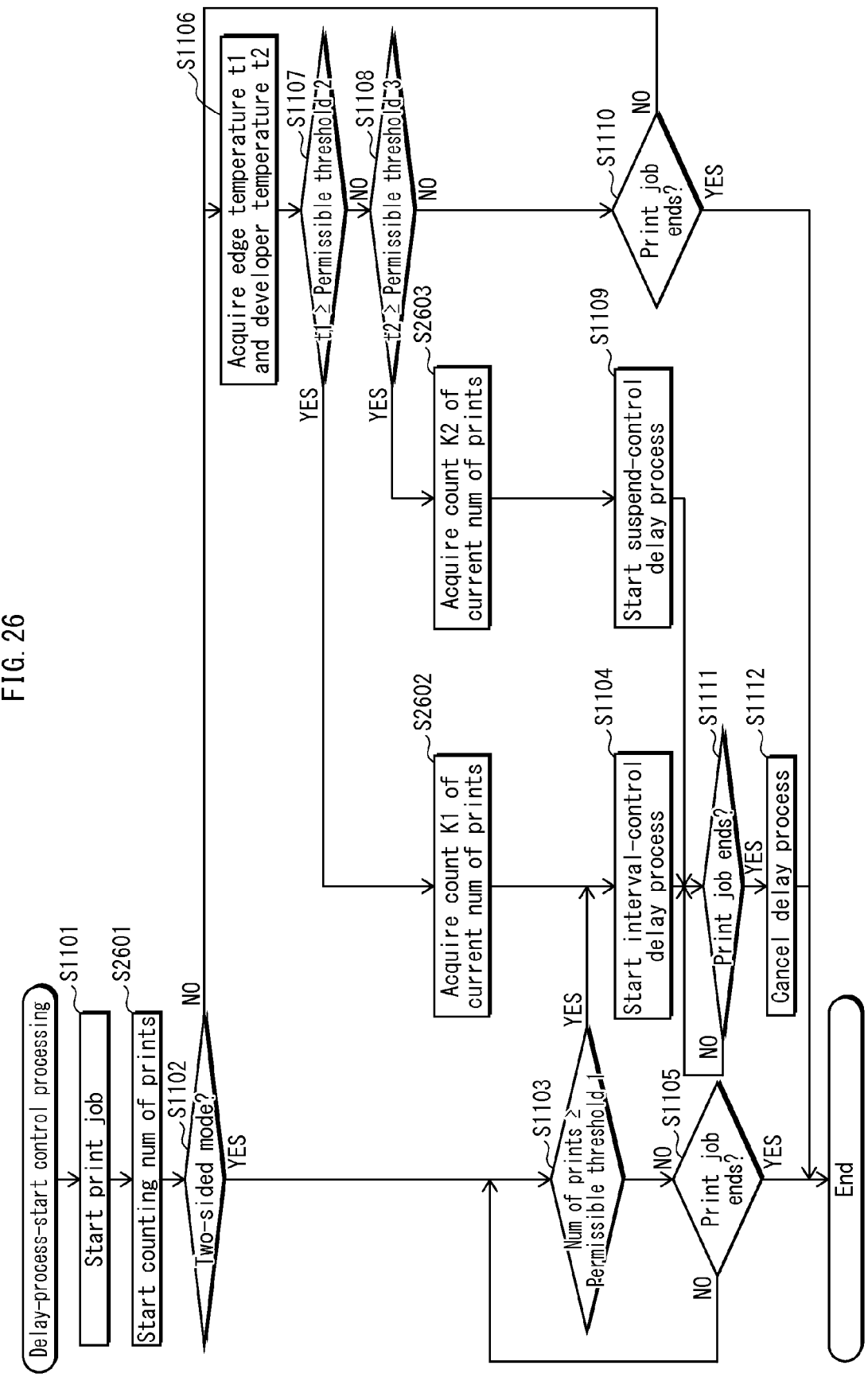
FIG. 26 is a flowchart of Modification 2 of delay-process-start control processing performed by the controller 60.

FIG. 26 is a flowchart showing the operations involved in a modified delay-process-start control processing performed by the controller 60. In the figure, the same steps as those of the delay-process-start control processing shown in FIG. 11 are denoted by the same step numbers. The following describes the differences.

After starting execution of the print job in Step S1101, the controller 60 starts counting the number of prints having been produced (Step S2601). When the value of t1 reaches the permissible threshold 2 in Step S1107 (Step S1107: Yes), the controller 60 acquires the current count (K1) of the number of prints having been produced in the print job (Step S2602).

Similarly, when the value of t2 reaches the permissible threshold 3 in Step S1108 (Step S1108: Yes), the controller 60 acquires the current count (K2) of the number of prints having been produced in the print job (Step S2603).

Figure 27:
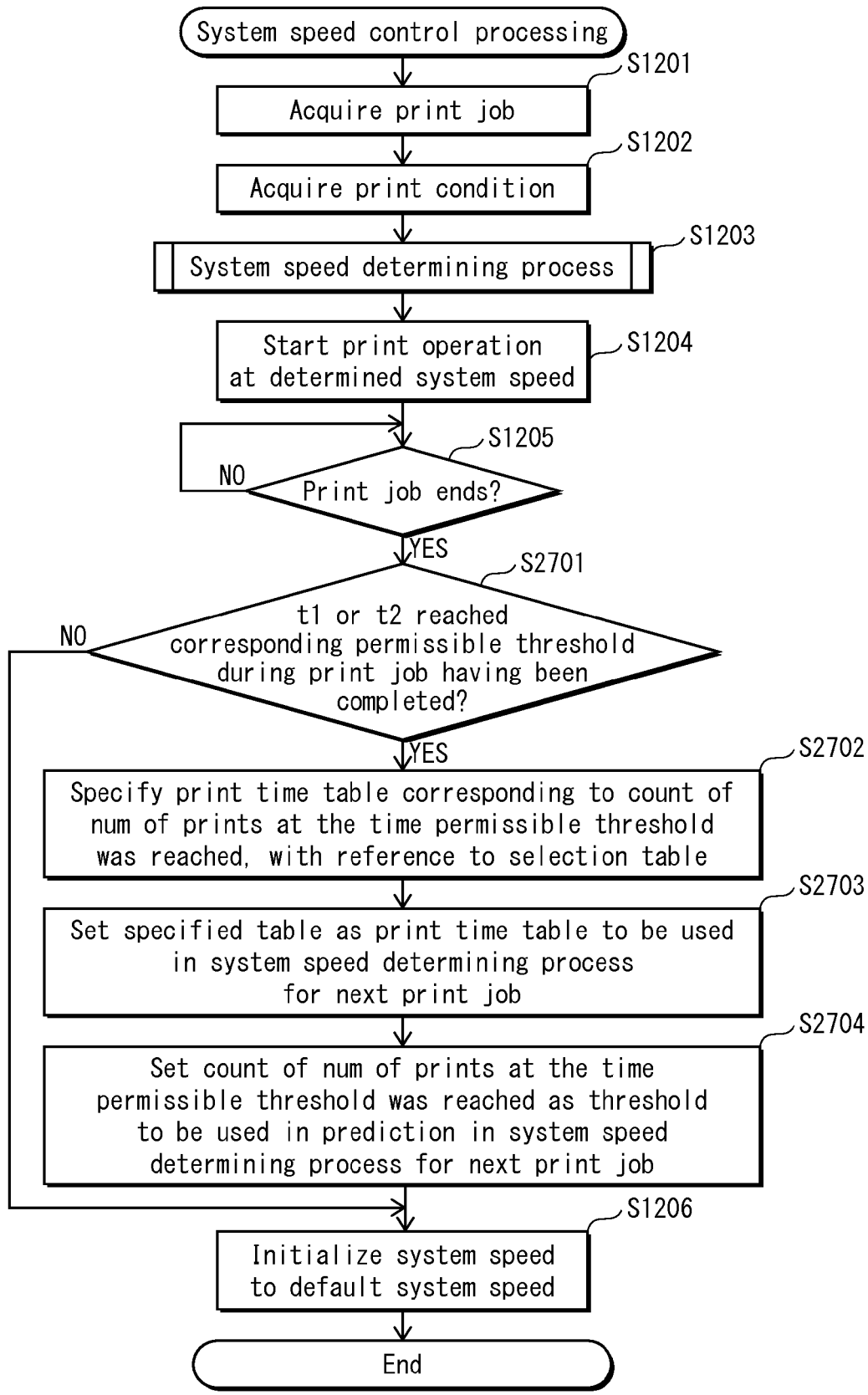
FIG. 27 is a flowchart of Modification 9 of system speed control processing performed by the controller 60.

FIG. 27 is a flowchart showing the operations involved in the modified system speed control processing performed by the controller 60. After completion of the print job in Step S1205 (Step S1205: Yes), the controller 60 judges whether or not the value of t1 reached the permissible threshold 2 or the value of t2 reached the permissible threshold 3 during the execution of the print job completed in Step S1205 (Step S2701). If the judgment results in the affirmative (Step S2701: Yes), the controller 60 acquires the selection table from the print-time-calculation-table storage 607 and specifies the print-time calculation table corresponding to the count K1 or K2 of the number of prints produced by the time the corresponding permissible threshold was reached (Step S2702).

More specifically, when the value of t1 reached the permissible threshold 2, the controller 60 specifies the edge-temperature-rise print-time calculation table corresponding in the selection table to the count K1 acquired in Step S2602. The count K1 indicates the number of prints having been produced by the time the permissible threshold 2 was reached.

Similarly, when the value of t2 reached the permissible threshold 3, the controller 60 specifies the developer-temperature-rise print-time calculation table corresponding in the selection table to the count K2. The count K2 indicates the number of prints having been produced by the time the permissible threshold 3 was reached.

Then, the controller 60 sets the print-time calculation table specified in Step S2702 as the print-time calculation table to be used in the system speed determining process for the next print job (Step S2703).

The controller 60 further sets the count, acquired in Step S2602 or S2603, of the number of prints having been produced by the time the permissible threshold was reached as the threshold to be used in the system speed determining process for the next print job in predicting whether or not the corresponding delay process will be performed (Step S2704). Then, the processing moves onto Step S1206.

More specifically, when the value of t1 reached the permissible threshold 2, the controller 60 performs Step S2704 to set the count K1 acquired in Step S2602 as the threshold 2 that is to be used in the system speed determining process for the next print job in predicting whether or not the second temperature-rise delay process will be started or not. As described above, the count K1 indicates the number of prints having been produced by the time the permissible threshold 2 was reached.

Similarly, when the value of t2 reached the permissible threshold 3, the controller 60 performs Step S2704 to set the count K2 acquired in Step S2603 as the threshold 3 that is to be used in the system speed determining process for the next print job in predicting whether or not the third temperature-rise delay process will be started or not. As described above, the count K2 indicates the number of prints having been produced by the time the permissible threshold 3 was reached.

Consequently, the system speed can be determined more accurately in the system speed determining process even when change occurs in the state of apparatus parts, such as the distribution of heat from the heater 533 disposed in the heating roller 53, and the amount of toner remaining in the developers. Such change affects: (i) the relationship between the temperatures used as the criteria for determining whether or not to start the second or third temperature-rise delay process and the numbers of prints used as the criteria for predicting the respective delay processes; (ii) the number of prints required to trigger the second or third temperature-rise delay process; and (iii) the relationship between the number of prints and the print time. The accurate determination of the system speed in the system speed determining process is still made possible by using the thresholds and print-time calculation tables that are determined in view of the influence of such change.

It is also expected that replacing an apparatus part (such as the heating belt 52, heating roller 53, or developer) significantly affects the relationship between the temperatures used as the criteria for determining whether or not to start the second or third temperature-rise and the numbers of prints used as the criteria for predicting the respective delay processes. Therefore, the following steps may be performed.

First is to empirically determine in advance: a threshold 2 (the number of prints expected to be produced to raise the edge temperature to reach the permissible threshold 2); a threshold 3 (the number of prints expected to be produced to raise the developer temperature to reach the permissible threshold); an edge-temperature-rise print-time calculation table; and a developer-temperature-rise print-time calculation table, provided that the corresponding apparatus part is in a brand new condition. The thresholds thus determined are stored to the threshold storage 608 as initial thresholds 2 and 3, and the tables thus determined are stored to the print-time calculation table 607 as an initial edge-temperature-rise print-time calculation table and an initial developer-temperature-rise print-time calculation table.

Figure 28:
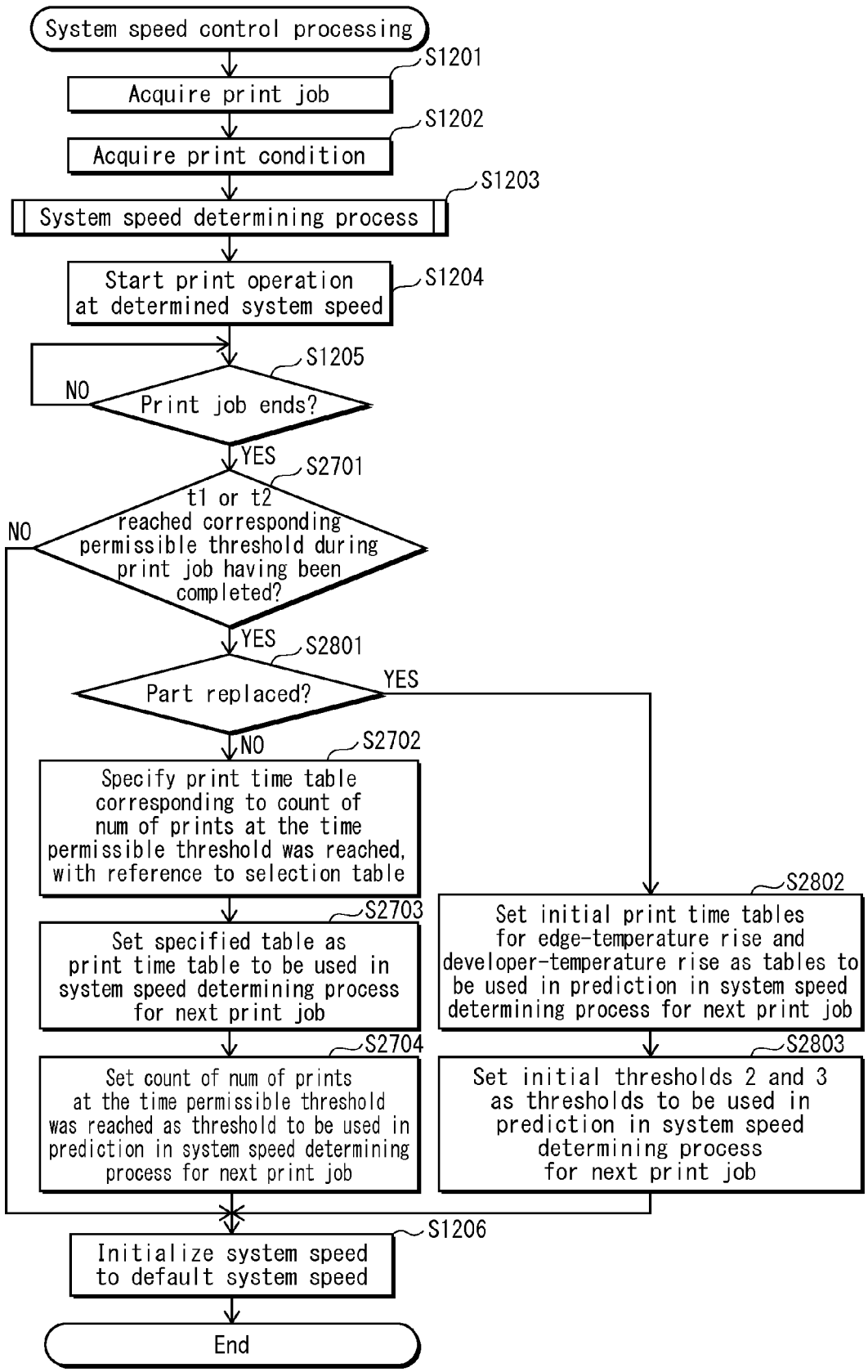
FIG. 28 is a flowchart of Modification 10 of system speed control processing performed by the controller 60.

Thus, the system speed control processing shown in FIG. 27 may be modified as shown in FIG. 28. In the figure, the same steps as those of the system speed control processing shown in FIG. 27 are denoted by the same step numbers. The following describes the differences. After Step S2701, the controller 60 judges whether or not an apparatus part has been replaced (Step S2801).

The judgment regarding part replacement is made in the following manner, for example. Each part is provided with an IC tag showing the identification number of the part. The controller 60 reads the identification number of each part when the part is mounted to the printer 1. The read identification numbers are stored to the memory. By comparing the identification numbers on the IC tags of the respective parts with the identification numbers stored in the memory, the controller 60 can judge whether or not an apparatus part has been replaced. (It is because a part replacing the old part has a different identification number. By detecting such an identification number, the controller 60 can detect that the part is replaced.)

When an apparatus part is replaced (Step S2801: Yes), the controller 60 acquires the initial edge-temperature-rise print-time calculation table and the initial developer-temperature-rise print-time calculation table from the print-time calculation table 607 and sets the respective tables as the print-time calculation tables to be used in the system speed determining process for the next print job (Step S2802).

The controller 60 also acquires the initial thresholds 2 and 3 from the threshold storage 608 and sets the respective initial thresholds as the thresholds 2 and 3 to be used in the system speed determining process for the next print job to predict whether or not delay process will be performed (Step S2803).

When only one apparatus part relevant to one of the initial print-time calculation tables as well as to one of the initial thresholds is replaced in Step S2801, then Step S2802 and Step S2803 are performed only with respect to the initial print-time calculation table and the threshold relevant to the replaced part. For example, replacement of the heating belt 52 and the heating roller heating roller 53 are relevant only to the initial edge-temperature-rise print-time calculation table as well as to the initial threshold 2, whereas replacement of the developers are relevant only to the initial developer-temperature-rise print-time calculation table as well as to the initial threshold 3. Thus, only one initial print-time calculation table and one initial threshold each relevant to the replaced part are set as the print-time calculation table and threshold to be used in the system speed determining process for the next print job.

Alternatively, Steps S2802 and S2803 may always be performed when an apparatus part is replaced (Step S2801: Yes) after completion of the print job (Step S1205: Yes) irrespective of the judgment result made in Step S2701.

Consequently, the system speed can be determined more accurately in the system speed determining process even when an apparatus part is replaced. Replacement of an apparatus part affects: (i) the relationship between the temperatures used as the criteria for determining whether or not to start the second or third temperature-rise delay process and the numbers of prints used as the criteria for predicting the respective delay processes; (ii) the number of prints required to trigger the second or third temperature-rise delay process; and (iii) the relationship between the number of prints and the print time. The accurate determination of the system speed in the system speed determining process is still made possible by using the thresholds and print-time calculation tables that are determined in view of the influence of apparatus part replacement.

(12) In the system speed determining process according to the present embodiment, the print time taken to complete a print job at each system speed is estimated by using a print-time calculation table. However, the method for estimating the print time may is not limited to the one using a print-time calculation table. For example, a relational expression defining the relationship between the number of prints and the print time can be prepared and stored to the controller 60. Then, the print time taken to complete a print job at a specific system speed may be estimated by using the relational expression. The same is applicable to the modifications described in (1) through (11) above.

(13) In the system speed control processing according to the present embodiment, the print speed is changed by changing the system speed to prevent execution of a print job at a print speed excessively higher. This prevents reduction in the print operation productivity because starting a print job at such a print speed is avoided. Alternatively, however, the print speed may be changed by changing the image forming intervals. This modification still achieves the same advantageous effects as those achieved by the present embodiment. Similarly, in the modifications described in (1) through (12), the print speed may be changed by changing the image forming intervals, instead of changing the system speed.

Note that changing the system speed (to a lower speed than the default system speed) is advantageous in suppressing frictional wearing of parts relevant to the image forming operation (namely, photoconductive drum, intermediate transfer belt, and the like) because their cumulative number of rotations is kept smaller as compared to changing the system speed by changing (increasing) the image forming intervals.

(14) According to the present embodiment, the system speed is changeable in three levels. However, the number of levels to which the system speed is changeable is not limited to three, as long as the system speed is changeable to at least two levels. In addition, the system speed may be made changeable continuously rather than in stepwise.

Recapitulation

An image forming apparatus according to one aspect of the present invention disclosed above is for executing a print job at an initial processing speed and switching the initial processing speed to a delayed processing speed lower than the initial processing speed upon detecting occurrence of a specific condition under which continuing the print job at the initial processing speed is determined not possible. The image forming apparatus includes: a job acquirer that acquires a print job targeted to be executed; an estimator that estimates a processing time to be taken to complete the target print job at each of a plurality of processing speeds selected as candidates for the initial processing speed; and a determiner that determines, as the initial processing speed, one of the candidate processing speeds that corresponds to the shortest processing time among the processing times estimated by the estimator.

Optionally, the image forming apparatus monitors at least one of: a temperature of a predetermined apparatus part relevant to an image forming operation; or a temperature of recording sheets having gone through a thermal fixing operation, and occurrence of the specific condition is detected when the monitored temperature reaches a permissible limit determined in advance for the corresponding temperature.

Optionally, the estimator acquires processing-time information indicating a relationship between the numbers of prints and processing times to be taken to produce the respective numbers of prints at each of the candidate processing speeds, and makes the estimation by using the processing-time information.

Optionally, the temperature of the predetermined apparatus part is: a temperature of a non-sheet-passing region of a rotatable heating element, the rotatable heating element being used for thermally fixing the unfixed toner image onto the recording sheet; and a temperature in a developer used to form an unfixed image on a recording sheet. The image forming apparatus monitors the temperature of the non-sheet-passing region, the temperature in the developer, and the temperature of recording sheets having gone through a thermal fixing operation. The permissible limit and the processing-time information are set for each of the temperatures monitored. When occurrence of the specific condition is predicted as a result that the temperature of recording sheets reaches the corresponding permissible limit, the determiner determines the initial processing speed by using the piece of processing-time information set for the temperature of recording sheet. When occurrence of the specific condition is predicted not as a result that the temperature of recording sheets reaches the permissible limit but as a result that the temperature of the non-sheet-passing region reaches the corresponding permissible limit, the determiner determines the initial processing speed by using the piece of processing-time information set for the temperature of the non-sheet-passing region. When occurrence of the specific condition is predicted not as a result that the temperature of recording sheets or the temperature of the non-sheet-passing region reaches the corresponding permissible limit but as a result that the temperature in the developer reaches the corresponding permissible limit, the determiner determines the initial processing speed by using the piece of processing-time information set for the temperature in the developer.

Optionally, the image forming apparatus further includes a calculating unit that calculates an average of coverage rates of respective pages of the target print job based on image data of the target print job. The image forming apparatus monitors the average calculated by the calculating unit. Occurrence of the specific condition is detected when the monitored average reaches a permissible limit determined in advance.

Optionally, the processing speed is switched by changing a system speed.

Optionally, the processing speed is switched by changing a system speed. The image forming apparatus further includes an initializer that initializes the system speed to a default system speed after all the print jobs acquired are completed.

With the configurations described above, the image forming apparatus can estimate the processing time taken to complete the print job at each candidate processing speed and determine the candidate processing speed corresponding to the shortest processing time as the initial processing speed. Therefore, the optimum processing speed is determined as the initial processing speed in view of possible switching of the processing speed to the delayed processing speed. This prevents a print job to be started at an excessively high processing speed, which causes earlier switching to the delayed processing speed. As a result, reduction in the print operation productivity is prevented.

Optionally, the image forming apparatus further includes a judging unit that predicts, based on the number of prints designated in the target print job, whether or not the specific condition will occur during execution of the target print job when the target print job is executed at the highest one of the plurality of candidate processing speeds. When occurrence of the specific condition is predicted, the estimator makes the estimation, and the determiner determines, as the initial processing speed, the candidate processing speed corresponding to the shortest processing time. When occurrence of the specific condition is not predicted, the estimator prohibits the estimation from being made, and the determiner determines the highest candidate processing speed as the initial processing speed.

Alternatively, the image forming apparatus further includes a judging unit that predicts, based on the average calculated by the calculating unit, whether or not the specific condition will occur during execution of the target print job when the target print job is executed at the highest one of the plurality of candidate processing speeds. When occurrence of the specific condition is predicted, the estimator makes the estimation, and the determiner determines, as the initial processing speed, the candidate processing speed corresponding to the shortest processing time. When occurrence of the specific condition is not predicted, the estimator prohibits the estimation from being made, and the determiner determines the highest candidate processing speed as the initial processing speed.

With the configurations described above, a prediction is made as to occurrence of the specific condition under which continuing the print operation is determined not possible. When the specific condition is not predicted and thus switching to the delayed processing speed is not expected, the candidate processing speed that is highest among the plurality of candidate processing speeds is determined as the initial processing speed. This reduces the processing burden required to determine the initial processing speed and ensures that the determination made efficiently.

Optionally, a judgment criterion for use in making the prediction is set for each of a multi-color printing mode and a single-color printing mode. The processing-time information is set for each of the multi-color printing mode and the single-color printing mode. The image forming apparatus further includes a specifier that specifies whether the target print job designates the multi-color printing mode or the single-color printing mode. The judging unit makes the prediction by using the judgment criterion set for the specified printing mode. The estimator acquires the piece of processing-time information set for the specified printing mode.

With the configuration described above, the initial processing speed is determined more appropriately in view of the difference in the printing modes. Consequently, reduction in the print operation productivity is prevented by avoiding the print job from being started at a processing speed not appropriate due to the influence of the difference in the print modes.

Optionally, a judgment criterion for use in making the prediction is set for each of a plurality of ranges of amounts of toner deposited per page of a print job. The processing-time information is set for each of a plurality of ranges of amounts of toner deposited per page of a print job. The image forming apparatus further includes an index acquirer that acquires an index indicating an amount of toner deposited per page of the target print job, the index being calculated from image data of the target print job. The judging unit makes the prediction by using the judgment criterion set for the range within which the amount of toner indicated by the index falls. The estimator acquires the piece of processing-time information set for the range within which the amount of toner indicated by the index falls.

With the configuration described above, the initial processing speed is determined more appropriately in view of the amount of toner deposited per page of the print job. Consequently, reduction in the print operation productivity is prevented by avoiding the print job from being started at a system speed not appropriate due to the influence of the amount of toner deposited.

Optionally, a judgment criterion for use in making the prediction is set for each of a plurality of ranges of temperatures in the image forming apparatus at a start of a print job. The processing-time information is set for each of a plurality of ranges of temperatures in the image forming apparatus at a start of a print job. The image forming apparatus further includes an apparatus temperature acquirer that acquires a temperature in the image forming apparatus upon acquisition of the target print job. The judging unit makes the prediction by using the judgment criterion set for the range within which the acquired apparatus temperature falls. The estimator acquires the piece of processing-time information set for the range within which the acquired apparatus temperature falls.

With the configuration described above, the initial processing speed is determined more appropriately in view of the temperature in the image forming apparatus at the start of the print job. Consequently, reduction in the print operation productivity is prevented by avoiding the print job from being started at a processing speed not appropriate due to the influence of the initial apparatus temperature.

Optionally, the temperature of the predetermined apparatus part is a temperature of a non-sheet-passing region of a rotatable heating element, the rotatable heating element being used for a thermal fixing operation of an unfixed toner image onto a recording sheet. A judgment criterion for use in making the prediction is set for each of a plurality of ranges of basis weights of recording sheets used in a print job. The processing-time information is set for each of a plurality of ranges of basis weights of recording sheets used in a print job. The image forming apparatus further includes a specifier that specifies a basis weight of recording sheets used in the target print job. The judging unit makes the prediction by using the judgment criterion set for the range within which the specified basis weight falls. The estimator acquires the piece of processing-time information set for the range within which the specified basis weight falls.

With the configuration described above, the initial processing speed is determined more appropriately in view of the basis weight of recording sheets used in the print job. Consequently, reduction in the print operation productivity is prevented by avoiding the print job from being started at a processing speed not appropriate due to the influence of the basis weight of recording sheets used in the print job.

Optionally, the temperature of the predetermined apparatus part is a temperature of a non-sheet-passing region of a rotatable heating element, the rotatable heating element being used for thermally fixing an unfixed toner image onto a recording sheet. The image forming apparatus monitors the temperature of the non-sheet-passing region. A judgment criterion for use in making the prediction is set for each of a plurality of ranges of recording sheet widths usable in a print job. The processing-time information is set for each of a plurality of ranges of recording sheet widths usable in a print job. The image forming apparatus further comprises a specifier that specifies a recording sheet width to be used in the target print job. The judging unit makes the prediction by using the judgment criterion set for the range within which the specified recording sheet width falls. The estimator acquires the piece of processing-time information set for the range within which the specified recording sheet width falls.

With the configuration described above, the initial processing speed is determined more appropriately in view of the recording sheet width used in the print job. Consequently, reduction in the print operation productivity is prevented by avoiding the print job from being started at a processing speed not appropriate due to the influence of the recording sheet width used in the print job.

Optionally, the image forming apparatus further includes a job execution controller that causes execution of the target print job to be started at the initial processing speed determined by the determiner. When the job acquirer acquires a new print job with a print condition identical to a print condition of the target print job during execution of the target print job at the initial processing speed. The estimator newly estimates a processing time to be taken to complete a series of the two print jobs at each candidate processing speed. The determiner newly determines one of the candidate processing speeds as the initial processing speed for the series of the two print jobs, the one candidate processing speed corresponding to the shortest processing time among the processing times newly estimated by the estimator. The job execution controller causes the series of the two print jobs to be executed at the newly determined processing speed until the switching to the delayed processing speed takes place.

With the configuration described above, when a new job is received with the same print condition during execution of the current print job, a processing time to be taken to complete a series of the two print jobs at each candidate processing speed is newly estimated. Then, the processing speed for series of the two print jobs is newly determined by selecting the candidate processing speed corresponding to the shortest processing time among the processing times newly estimated. Therefore, when the number of prints to be produced in the continual print operation increases as a result that a new job is received with the same print condition during execution of the current print job, the processing speed is adjusted to the optimum speed newly determined in view of the increase in the number of prints to be produced. Consequently, reduction in the print operation productivity is prevented by avoiding the print operation to be continued at the system speed initially determined based on the number of prints before the increase.

Optionally, the image forming apparatus further includes: a job execution controller that causes execution of the target print job to be started at the initial processing speed determined by the determiner; and an interruption duration index acquirer that acquires an index indicating an interruption duration when the print job being executed at the initial processing speed is interrupted. When the interruption duration indicated by the index is equal to a predetermined duration or longer, (i) the estimator newly estimates a processing time to be taken to complete an unfinished part of the print job at each of the candidate processing speeds, (ii) the determiner newly determines one of the candidate processing speeds as the initial processing speed for the unfinished part of the print job, the one candidate processing speed corresponding to the shortest processing time among the processing times newly estimated by the estimator, and (iii) the job execution controller causes execution of the unfinished part of the print job to be started at the newly determined processing speed. When the interruption duration indicated by the index is shorter than the predetermined duration, the job execution controller causes execution of the unfinished part of the print job to be started at the initial processing speed determined before the interruption.

With the configuration described above, when the print job being executed is interrupted and the interruption duration is equal to the predetermine duration or longer, the processing time to be taken to complete an unfinished part of the print job at each of the candidate processing speeds is newly estimated. Then, the processing speed at which the unfinished part of the print job is to be resumed is newly determined by selecting the candidate processing speed corresponding to the shortest processing time among the processing times newly estimated. Consequently, reduction in the print operation productivity is prevented by avoiding the print job from being resumed at a system speed too high or too low to compensate for the influence of the interruption.

Optionally, the image forming apparatus monitors a temperature of a predetermined apparatus part relevant to an image forming operation, and the estimator acquires processing-time information indicating a relationship between the numbers of prints and processing times to be taken to produce the respective numbers of prints at each of the candidate processing speeds, and makes the estimation by using the processing-time information. The image forming apparatus further includes: a count acquirer that counts the number of prints having been produced in the print job executed at a processing speed higher than the delayed processing speed, thereby to acquire a delay-process-start count indicating the count of the number of prints having been produced by the time the processing speed is switched to the delayed processing speed; and a storage that stores a plurality of pieces of processing-time information in correspondence with ranges of delay-process-start counts, each piece of processing-time information indicating a relationship between the numbers of prints and processing times to be taken to produce the respective numbers of prints at each of the candidate processing speeds. The estimator acquires, from the storage, the piece of processing-time information corresponding to the range within which the delay-process-start count acquired by the count acquirer falls and uses the acquired piece of processing-time information in making the estimation for a print job to be acquired subsequently to the target print job.

With the configuration described above, the following is achieved. When the condition of the predetermined apparatus part changes, the change affects the number of prints expected to cause the switching of the initial processing speed to the delayed processing speed. As a result, the relationship between the number of prints and print time changes. Yet, by using the processing-time information having been prepared in view of such change, the processing speed is optimally determined, so that reduction in the print operation productivity is prevented.

Optionally, the image forming apparatus further includes a detector that detects replacement of the predetermined apparatus part. The storage further stores therein initial processing-time information to be used with the delay-process-start count when the predetermined apparatus part is in a brand new condition. When replacement of the predetermined apparatus part is detected, the estimator prohibits the acquisition of the piece of processing-time information corresponding to the range within which the delay-process-start count acquired by the count acquirer falls, and acquires, from the storage, the initial processing-time information as the piece of processing-time information and uses the initial processing-time information in making the estimation for the subsequent print job.

With the configuration described above, the following is achieved. When the predetermined apparatus part is replaced with a new one, the replacement affects the number of prints expected to cause the switching of the initial processing speed to the delayed processing speed. As a result the relationship between the number of prints and print time changes. Yet, by using the initial processing-time information having been prepared in view of such change, the print speed is optimally determined so that reduction in the print operation productivity is prevented.

Optionally, the image forming apparatus monitors the temperature of a predetermined apparatus part relevant to an image forming operation. The image forming apparatus further includes: a count acquirer that counts the number of prints having been produced in the print job executed at a processing speed higher than the delayed processing speed, thereby to acquire a delay-process-start count indicating the count of the number of prints having been produced by the time the processing speed is switched to the delayed processing speed; and a storage that stores a plurality of pieces of processing-time information in correspondence with ranges of delay-process-start counts, each piece of processing-time information indicating a relationship between the numbers of prints and processing times to be taken to produce the respective numbers of prints at each of the candidate processing speeds. The judging unit makes the prediction regarding a print job to be acquired subsequently to the target print job by judging whether or not the number of prints designated by the subsequent print job is equal to or greater than the delay-process-start count acquired by the count acquirer. The estimator acquires, from the storage, the piece of processing-time information corresponding to the range within which the delay-process-start count acquired by the count acquirer falls and uses the acquired piece of processing-time information in making the estimation for the subsequent print job.

With the configuration described above, the following is achieved. When the condition of the predetermined apparatus part changes, the change affects the number of prints expected to cause the switching of the initial processing speed to the delayed processing speed. As a result the relationship between the number of prints and print time changes. Yet, by using the delay-process-start count having been prepared in view of such change, the image forming apparatus can still accurately predict occurrence of the specific condition under which continuing the print operation is determined not possible. In addition, by using the processing-time information having been prepared in view of such change, the processing speed is optimally determined so that reduction in the print operation productivity is prevented.

Optionally, the image forming apparatus further includes a detector that detects replacement of the predetermined apparatus part. The storage further stores therein: an initial delay-process-start count to be used as a delay-process-start count when the predetermined apparatus part is in a brand new condition; and initial processing-time information to be used with the initial delay-process-start count when the predetermined apparatus part is in a brand new condition. When replacement of the predetermined apparatus part is detected, (i) the judging unit prohibits the prediction from being made based on whether or not the number of prints designated by the subsequent print job is equal to or greater than the delay-process-start count that is acquired by the count acquirer, and instead makes the prediction based on whether or not the number of prints designated by the subsequent print job is equal to or greater than the initial delay-process-start count, and (ii) the estimator prohibits the acquisition of the piece of processing-time information corresponding to the range within which the delay-process-start count acquired by the count acquirer falls, and instead acquires from the storage the initial processing-time information, and makes the estimation for the subsequent print job by using the initial processing-time information acquired from the storage.

With the configuration described above, the following is achieved. When the predetermined apparatus part is replaced with a new one, the replacement affects the number of prints expected to cause the switching of the initial processing speed to the delayed processing speed. As a result the relationship between the number of prints and print time changes. Yet, by using the initial delay-process-start count having been prepared in view of such change, the image forming apparatus can still accurately predict occurrence of the specific condition under which continuing the print operation is determined not possible. In addition, by using the initial processing-time information having been prepared in view of such change, the processing speed is optimally determined so that reduction in the print operation productivity is prevented.

Optionally, the image forming apparatus monitors a temperature of a predetermined apparatus part relevant to an image forming operation. The judging unit makes the prediction based on whether or not the number of prints exceeds a threshold. The image forming apparatus further includes: a job execution controller that causes execution of the target print job to be started at the initial processing speed determined by the determiner and controls the switching to the delayed processing speed; and a counter that counts the number of prints having been produced in the target print job. When occurrence of the specific condition is detected as a result that the temperature of the predetermined apparatus part reaches the corresponding permissible limit, the job execution controller (i) compares the number of prints counted by the counter against the threshold, (ii) prohibits the switching to the delayed processing speed and causes a unfinished part of the print job to be executed at a processing speed that is higher than the delayed processing speed but lower than the initial processing speed as long as the number of prints counted is smaller than the threshold by a predetermined value, and (iii) causes the switching to the delayed processing speed when the number of prints counted by the counter reaches the threshold.

With the configuration described above, the following is achieved. When the specific condition under which continuing the print operation is determined not possible occurs before the number of prints having been produced reaches the threshold indicating the number of prints predicted to cause the occurrence, execution of the delay process is withheld and the system speed is reduced (to a print speed higher than that used during the delay process) until the threshold is reached. Consequently, reduction in the print operation productivity is prevented by avoiding the system speed switching from occurring earlier than actually necessary. In addition, reducing the system speed is effective to mitigate the rapid temperature rise of the apparatus part.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus for executing a print job at an initial processing speed at a beginning of the print job and switching the initial processing speed to a delayed processing speed lower than the initial processing speed upon detecting occurrence of a specific condition under which continuing the print job at the initial processing speed is determined not possible, the image forming apparatus comprising:
   a job acquirer that acquires a print job targeted to be executed;
   an estimator that estimates a processing time to be taken to complete the targeted print job for each of a plurality of processing speeds selected as candidates for the initial processing speed at the beginning of the print job; and
   a determiner that determines, as the initial processing speed, one of the candidates for the initial processing speed that corresponds to a shortest processing time among the processing times estimated by the estimator.

2. The image forming apparatus according to claim 1, wherein
   the image forming apparatus monitors at least one of:
      a temperature of a predetermined apparatus part relevant to an image forming operation; or
      a temperature of recording sheets having gone through a thermal fixing operation, and
   occurrence of the specific condition is detected when the monitored temperature reaches a permissible limit determined in advance for the corresponding temperature.

3. The image forming apparatus according to claim 2, further comprising:
   a judging unit that predicts, based on a number of prints designated in the targeted print job, whether or not the specific condition will occur during execution of the targeted print job when the targeted print job is executed at a highest one of the plurality of candidates for the initial processing speed, wherein
   when occurrence of the specific condition is predicted,
      the estimator makes the estimation, and
      the determiner determines, as the initial processing speed, the one candidate for the initial processing speed corresponding to the shortest processing time, and
   when occurrence of the specific condition is not predicted,
      the estimator prohibits the estimation from being made, and
      the determiner determines the highest one of the candidates for the initial processing speed as the initial processing speed.

4. The image forming apparatus according to claim 3, wherein
   the estimator acquires processing-time information indicating a relationship between the numbers of prints and processing times to be taken to produce the respective numbers of prints at each of the candidate processing speeds, and makes the estimation by using the processing-time information.

5. The image forming apparatus according to claim 4, wherein
   a judgment criterion for use in making a prediction is set for each of a multi-color printing mode and a single-color printing mode,
   the processing-time information is set for each of the multi-color printing mode and the single-color printing mode,
   the image forming apparatus further comprises a specifier that specifies whether the targeted print job designates the multi-color printing mode or the single-color printing mode,
   the judging unit makes the prediction by using the judgment criterion set for the specified printing mode, and
   the estimator acquires a piece of processing-time information set for the specified printing mode.

6. The image forming apparatus according to claim 4, wherein
   a judgment criterion for use in making a prediction is set for each of a plurality of ranges of amounts of toner deposited per page of a print job,
   the processing-time information is set for each of a plurality of ranges of amounts of toner deposited per page of a print job,
   the image forming apparatus further comprises an index acquirer that acquires an index indicating an amount of toner deposited per page of the targeted print job, the index being calculated from image data of the targeted print job,
   the judging unit makes the prediction by using the judgment criterion set for the range within which the amount of toner indicated by the index falls, and
   the estimator acquires a piece of processing-time information set for the range within which the amount of toner indicated by the index falls.

7. The image forming apparatus according to claim 4, wherein
   a judgment criterion for use in making a prediction is set for each of a plurality of ranges of temperatures in the image forming apparatus at a start of a print job,
   the processing-time information is set for each of a plurality of ranges of temperatures in the image forming apparatus at a start of a print job,
   the image forming apparatus further comprises an apparatus temperature acquirer that acquires a temperature in the image forming apparatus upon acquisition of the targeted print job,
   the judging unit makes the prediction by using the judgment criterion set for the range within which the acquired apparatus temperature falls, and
   the estimator acquires the piece of processing-time information set for the range within which the acquired apparatus temperature falls.

8. The image forming apparatus according to claim 4, wherein
the temperature of the predetermined apparatus part is a temperature of a non-sheet-passing region of a rotatable heating element, the rotatable heating element being used for a thermal fixing operation of an unfixed toner image onto a recording sheet,
a judgment criterion for use in making a prediction is set for each of a plurality of ranges of basis weights of recording sheets used in a print job,
the processing-time information is set for each of a plurality of ranges of basis weights of recording sheets used in a print job,
the image forming apparatus further comprises a specifier that specifies a basis weight of recording sheets used in the targeted print job,
the judging unit makes the prediction by using the judgment criterion set for the range within which the specified basis weight falls, and
the estimator acquires the piece of processing-time information set for the range within which the specified basis weight falls.

9. The image forming apparatus according to claim 4, wherein
the temperature of the predetermined apparatus part is a temperature of a non-sheet-passing region of a rotatable heating element, the rotatable heating element being used for thermally fixing an unfixed toner image onto a recording sheet,
the image forming apparatus monitors the temperature of the non-sheet-passing region,
a judgment criterion for use in making a prediction is set for each of a plurality of ranges of recording sheet widths usable in a print job,
the processing-time information is set for each of a plurality of ranges of recording sheet widths usable in a print job,
the image forming apparatus further comprises a specifier that specifies a recording sheet width to be used in the targeted print job,
the judging unit makes the prediction by using the judgment criterion set for the range within which the specified recording sheet width falls, and
the estimator acquires the piece of processing-time information set for the range within which the specified recording sheet width falls.

10. The image forming apparatus according to claim 2, further comprising:
a job execution controller that causes execution of the targeted print job to be started at the initial processing speed determined by the determiner, wherein
when the job acquirer acquires a new print job with a print condition identical to a print condition of the target print job during execution of the targeted print job at the initial processing speed,
the estimator newly estimates a processing time to be taken to complete a series of the two print jobs at each candidate processing speed,
the determiner newly determines one of the candidates for the initial processing speed as the initial processing speed for the series of the two print jobs, the one candidate for the initial processing speed corresponding to the shortest processing time among the processing times newly estimated by the estimator, and
the job execution controller causes the series of the two print jobs to be executed at the newly determined processing speed until the switching to the delayed processing speed takes place.

11. The image forming apparatus according to claim 2, further comprising:
a job execution controller that causes execution of the targeted print job to be started at the initial processing speed determined by the determiner; and
an interruption duration index acquirer that acquires an index indicating an interruption duration when the print job being executed at the initial processing speed is interrupted,
when the interruption duration indicated by the index is equal to a predetermined duration or longer,
the estimator newly estimates a processing time to be taken to complete an unfinished part of the print job at each of the candidate processing speeds,
the determiner newly determines one of the candidate processing speeds as the initial processing speed for the unfinished part of the print job, the one candidate for the initial processing speed corresponding to the shortest processing time among the processing times newly estimated by the estimator, and
the job execution controller causes execution of the unfinished part of the print job to be started at the newly determined processing speed, and
when the interruption duration indicated by the index is shorter than the predetermined duration,
the job execution controller causes execution of the unfinished part of the print job to be started at the initial processing speed determined before the interruption.

12. The image forming apparatus according to claim 4, wherein
the temperature of the predetermined apparatus part is:
a temperature of a non-sheet-passing region of a rotatable heating element, the rotatable heating element being used for thermally fixing the unfixed toner image onto the recording sheet; and
a temperature in a developer used to form an unfixed image on a recording sheet,
the image forming apparatus monitors the temperature of the non-sheet-passing region, the temperature in the developer, and the temperature of recording sheets having gone through a thermal fixing operation,
the permissible limit and the processing-time information are set for each of the temperatures monitored,
when occurrence of the specific condition is predicted as a result that the temperature of recording sheets reaches the corresponding permissible limit, the determiner determines the initial processing speed by using the piece of processing-time information set for the temperature of recording sheet,
when occurrence of the specific condition is predicted not as a result that the temperature of recording sheets reaches the permissible limit but as a result that the temperature of the non-sheet-passing region reaches the corresponding permissible limit, the determiner determines the initial processing speed by using the piece of processing-time information set for the temperature of the non-sheet-passing region,
when occurrence of the specific condition is predicted not as a result that the temperature of recording sheets or the temperature of the non-sheet-passing region reaches the corresponding permissible limit but as a result that the temperature in the developer reaches the corresponding permissible limit, the determiner determines the initial processing speed by using the piece of processing-time information set for the temperature in the developer.

13. The image forming apparatus according to claim 2, wherein the image forming apparatus monitors a temperature of a predetermined apparatus part relevant to an image forming operation, the estimator acquires processing-time information indicating a relationship between the numbers of prints and processing times to be taken to produce the respective numbers of prints at each of the candidate processing speeds, and makes the estimation by using the processing-time information, the image forming apparatus further comprises:
 a count acquirer that counts the number of prints having been produced in the print job executed at a processing speed higher than the delayed processing speed, thereby to acquire a delay-process-start count indicating the count of the number of prints having been produced by the time the processing speed is switched to the delayed processing speed; and
 a storage that stores a plurality of pieces of processing-time information in correspondence with ranges of delay-process-start counts, each piece of processing-time information indicating a relationship between the numbers of prints and processing times to be taken to produce the respective numbers of prints at each of the candidate processing speeds, and the estimator acquires, from the storage, the piece of processing-time information corresponding to the range within which the delay-process-start count acquired by the count acquirer falls and uses the acquired piece of processing-time information in making the estimation for a print job to be acquired subsequently to the targeted print job.

14. The image forming apparatus according to claim 13, further comprising a detector that detects replacement of the predetermined apparatus part, wherein the storage further stores therein initial processing-time information to be used with the delay-process-start count when the predetermined apparatus part is in a brand new condition, and when replacement of the predetermined apparatus part is detected, the estimator
 prohibits the acquisition of the piece of processing-time information corresponding to the range within which the delay-process-start count acquired by the count acquirer falls, and
 acquires, from the storage, the initial processing-time information as the piece of processing-time information and uses the initial processing-time information in making the estimation for the subsequent print job.

15. The image forming apparatus according to claim 4, wherein the image forming apparatus monitors the temperature of a predetermined apparatus part relevant to an image forming operation, the image forming apparatus further comprises:
 a count acquirer that counts the number of prints having been produced in the print job executed at a processing speed higher than the delayed processing speed, thereby to acquire a delay-process-start count indicating the count of the number of prints having been produced by the time the processing speed is switched to the delayed processing speed; and
 a storage that stores a plurality of pieces of processing-time information in correspondence with ranges of delay-process-start counts, each piece of processing-time information indicating a relationship between the numbers of prints and processing times to be taken to produce the respective numbers of prints at each of the candidate processing speeds, the judging unit makes the prediction regarding a print job to be acquired subsequently to the targeted print job by judging whether or not the number of prints designated by the subsequent print job is equal to or greater than the delay-process-start count acquired by the count acquirer, and the estimator acquires, from the storage, the piece of processing-time information corresponding to the range within which the delay-process-start count acquired by the count acquirer falls and uses the acquired piece of processing-time information in making the estimation for the subsequent print job.

16. The image forming apparatus according to claim 15, further comprising a detector that detects replacement of the predetermined apparatus part, wherein the storage further stores therein
 an initial delay-process-start count to be used as a delay-process-start count when the predetermined apparatus part is in a brand new condition, and
 initial processing-time information to be used with the initial delay-process-start count when the predetermined apparatus part is in a brand new condition, and when replacement of the predetermined apparatus part is detected,
 the judging unit prohibits the prediction from being made based on whether or not the number of prints designated by the subsequent print job is equal to or greater than the delay-process-start count that is acquired by the count acquirer, and instead makes the prediction based on whether or not the number of prints designated by the subsequent print job is equal to or greater than the initial delay-process-start count, and
 the estimator prohibits the acquisition of the piece of processing-time information corresponding to the range within which the delay-process-start count acquired by the count acquirer falls, and instead acquires from the storage the initial processing-time information, and makes the estimation for the subsequent print job by using the initial processing-time information acquired from the storage.

17. The image forming apparatus according to claim 3, wherein the image forming apparatus monitors a temperature of a predetermined apparatus part relevant to an image forming operation, the judging unit makes the prediction based on whether or not the number of prints exceeds a threshold, the image forming apparatus further comprises:
 a job execution controller that causes execution of the targeted print job to be started at the initial processing speed determined by the determiner and controls the switching to the delayed processing speed; and
 a counter that counts the number of prints having been produced in the targeted print job, when occurrence of the specific condition is detected as a result that the temperature of the predetermined apparatus part reaches the corresponding permissible limit, the job execution controller:

compares the number of prints counted by the counter against the threshold;

prohibits the switching to the delayed processing speed and causes a unfinished part of the print job to be executed at a processing speed that is higher than the delayed processing speed but lower than the initial processing speed as long as the number of prints counted is smaller than the threshold by a predetermined value; and causes the switching to the delayed processing speed when the number of prints counted by the counter reaches the threshold.

18. The image forming apparatus according to claim 1, further comprising a calculating unit that calculates an average of coverage rates of respective pages of the targeted print job based on image data of the target print job, wherein the image forming apparatus monitors the average calculated by the calculating unit, and occurrence of the specific condition is detected when the monitored average reaches a permissible limit determined in advance.

19. The image forming apparatus according to claim 18, further comprising a judging unit that predicts, based on the average calculated by the calculating unit, whether or not the specific condition will occur during execution of the targeted print job when the targeted print job is executed at a highest one of the plurality of candidates for the initial processing speed, when occurrence of the specific condition is predicted,
the estimator makes the estimation, and
the determiner determines, as the initial processing speed, the one candidate for the initial processing speed corresponding to the shortest processing time, and when occurrence of the specific condition is not predicted,
the estimator prohibits the estimation from being made, and
the determiner determines the highest one of the plurality of candidates for the initial processing speed as the initial processing speed.

20. The image forming apparatus according to claim 1, wherein the processing speed is switched by changing a system speed.

21. The image forming apparatus according to claim 1, wherein the initial processing speed is switched by changing a system speed, and the image forming apparatus further comprises an initializes that initializes the system speed to a default system speed after all the print job acquired is completed.

* * * * *